US012068593B2

(12) United States Patent
Stifter, Jr. et al.

(10) Patent No.: US 12,068,593 B2
(45) Date of Patent: Aug. 20, 2024

(54) SYSTEMS AND METHODS FOR DUST AND LIQUID PROTECTED CONTINUOUS ACCESS BUSWAY TRUNKING SYSTEMS

(71) Applicant: Starline Holdings, LLC, Canonsburg, PA (US)

(72) Inventors: Frank Joseph Stifter, Jr., Bridgeville, PA (US); Douglas Raymond Moore, Charlotte, NC (US); David Philip Marple, Canonsburg, PA (US); John Donald Berenbrok, Beaver, PA (US); Lucas Anthony Andrews, Clinton, PA (US); Timothy Russell Fox, Pittsburgh, PA (US); Edward James Schultz, Cuddy, PA (US)

(73) Assignee: Starline Holdings, LLC, Canonsburg, PA (US)

( * ) Notice: Subject to any disclaimer, the term of this patent is extended or adjusted under 35 U.S.C. 154(b) by 299 days.

(21) Appl. No.: 17/368,275

(22) Filed: Jul. 6, 2021

(65) Prior Publication Data
US 2022/0173584 A1  Jun. 2, 2022

Related U.S. Application Data

(60) Provisional application No. 63/048,497, filed on Jul. 6, 2020.

(51) Int. Cl.
*H02G 5/00* (2006.01)
*H01R 25/14* (2006.01)
*H01R 25/16* (2006.01)

(52) U.S. Cl.
CPC ............. *H02G 5/007* (2013.01); *H01R 25/14* (2013.01); *H01R 25/162* (2013.01)

(58) Field of Classification Search
None
See application file for complete search history.

(56) References Cited

U.S. PATENT DOCUMENTS

| 2,043,796 A | * | 6/1936 | Harrison | .................. | H02G 5/06 |
| | | | | | 174/68.2 |
| 2,277,212 A | * | 3/1942 | Cunningham | ........... | H02G 5/08 |
| | | | | | 439/826 |

(Continued)

FOREIGN PATENT DOCUMENTS

| CN | 104919663 A | * | 9/2015 | ........... H01R 25/162 |
| CN | 105745801 B | * | 6/2017 | ............. H01R 13/53 |

(Continued)

OTHER PUBLICATIONS

DE102010032383_English_translation (Year: 2010).*

(Continued)

*Primary Examiner* — Timothy J. Dole
*Assistant Examiner* — Muhammed Azam
(74) *Attorney, Agent, or Firm* — McCarter & English, LLP

(57) ABSTRACT

An example busway system is provided that includes a first busway, a second busway, and a joint seal coupling the first busway to the second busway. The first busway includes a first end and an opposing second end, and the second busway includes a third end and an opposing fourth end. The joint seal includes panels configured to at least partially slide over the first or the opposing second end of the first busway, and at least partially slide over the third or the opposing fourth end of the second busway to couple the first busway to the second busway. The joint seal creates a seal at a joint formed by the first busway, the second busway, and the joint seal.

20 Claims, 30 Drawing Sheets

(56) References Cited

U.S. PATENT DOCUMENTS

| | | | | |
|---|---|---|---|---|
| 2,669,632 A * | 2/1954 | Hammerly | | H01R 25/14 191/23 R |
| 2,786,152 A * | 3/1957 | Elbert | | H02G 5/06 174/33 |
| 2,906,808 A * | 9/1959 | Krauss | | H02G 5/06 174/72 B |
| 2,906,811 A * | 9/1959 | Fisher | | H02G 5/08 174/88 B |
| 2,931,097 A * | 4/1960 | Somes, Jr. | | H02G 5/06 174/40 R |
| 2,955,147 A * | 10/1960 | Carlson | | H02G 5/06 174/68.2 |
| 2,997,555 A * | 8/1961 | Carlson | | H02G 5/08 174/68.2 |
| 3,004,097 A * | 10/1961 | Johnston | | H02G 5/007 174/88 B |
| 3,209,301 A * | 9/1965 | Duffy, Jr. | | H02G 5/08 200/50.2 |
| 3,268,848 A * | 8/1966 | Adams | | H02B 1/36 174/99 B |
| 3,287,487 A * | 11/1966 | Fehr, Jr. | | H02G 3/0608 174/88 B |
| 3,365,537 A * | 1/1968 | Fehr, Jr. | | H02G 5/007 174/88 B |
| 3,636,237 A * | 1/1972 | Hafer | | H02G 5/06 174/88 B |
| 3,644,663 A * | 2/1972 | Carlson | | H02G 9/065 174/117 FF |
| 3,882,265 A * | 5/1975 | Johnston | | H02G 5/08 174/117 FF |
| 4,067,257 A * | 1/1978 | Pentith | | B60M 1/34 104/140 |
| 4,146,285 A * | 3/1979 | Cook | | H01R 25/16 174/88 B |
| 4,866,216 A * | 9/1989 | Slicer | | H02G 5/06 277/645 |
| 4,945,188 A * | 7/1990 | Jackson | | H02G 5/002 174/70 B |
| 4,979,906 A * | 12/1990 | Shrout | | H02G 5/007 174/88 B |
| 5,449,056 A * | 9/1995 | Ross | | B65G 54/02 191/6 |
| 5,505,630 A * | 4/1996 | Petrisko | | H02G 5/06 439/137 |
| 5,811,733 A * | 9/1998 | Flaig | | H02G 5/06 439/212 |
| 6,180,885 B1 * | 1/2001 | Goldman | | H02G 5/06 174/68.2 |
| 6,296,498 B1 * | 10/2001 | Ross | | H01R 25/145 439/115 |
| 9,190,791 B1 * | 11/2015 | Jaena | | H01R 25/145 |
| 9,407,079 B1 * | 8/2016 | Kokenda | | H02G 5/002 |
| 10,505,324 B2 * | 12/2019 | Lewis | | H01R 13/652 |
| 10,826,283 B1 * | 11/2020 | Blinn | | B66C 13/22 |
| 11,031,743 B2 * | 6/2021 | Yanagida | | H01M 10/647 |
| 2002/0117322 A1 | 8/2002 | Hilgert et al. | | |
| 2010/0319958 A1 * | 12/2010 | Latimer | | H02G 5/005 174/110 D |
| 2012/0118605 A1 * | 5/2012 | Williford | | H02G 5/06 174/68.2 |
| 2015/0008007 A1 * | 1/2015 | Jur | | H02G 3/0418 174/68.2 |
| 2017/0170616 A1 * | 6/2017 | Wynnik | | H01R 25/145 |
| 2018/0102632 A1 * | 4/2018 | Byrne | | H02B 1/20 |
| 2018/0323561 A1 * | 11/2018 | Wynnik | | H01R 25/162 |
| 2019/0020159 A1 * | 1/2019 | Wynnik | | H02G 5/007 |
| 2019/0120890 A1 * | 4/2019 | Patel | | G01K 1/14 |

FOREIGN PATENT DOCUMENTS

| | | | | | |
|---|---|---|---|---|---|
| CN | 107425492 | A | * | 12/2017 | ............ H02G 5/06 |
| CN | 107706860 | A | | 2/2018 | |
| CN | 109088375 | A | * | 12/2018 | ............ H02G 5/06 |
| CN | 109149482 | A | * | 1/2019 | ............ H02G 5/06 |
| CN | 110198021 | A | * | 9/2019 | |
| CN | 111614043 | A | * | 9/2020 | ............ H02G 5/06 |
| DE | 19832692 | A1 | * | 1/2000 | ............ H02G 5/06 |
| DE | 19859716 | A1 | * | 6/2000 | ............ H02B 1/042 |
| DE | 102009032619 | A1 | * | 1/2011 | ............ H02G 5/002 |
| DE | 102010026011 | A1 | * | 12/2011 | ............ H02G 5/007 |
| DE | 202013000183 | U1 | * | 4/2013 | ............ H01R 25/14 |
| DE | 202014100332 | U1 | * | 3/2014 | ........... F21V 21/025 |
| DE | 102017125275 | A1 | * | 5/2019 | ............ H01R 13/05 |
| DE | 102019126933 | A1 | * | 4/2021 | .......... H01R 25/145 |
| EA | 029142 | B1 | * | 2/2018 | |
| EP | 0322203 | A2 | * | 6/1989 | |
| EP | 0933855 | A1 | * | 8/1999 | ............ H02G 5/002 |
| EP | 2107659 | A1 | | 10/2009 | |
| EP | 2461445 | A2 | * | 6/2012 | ............ H02G 5/007 |
| EP | 3200299 | B1 | | 10/2018 | |
| EP | 4102663 | A1 | * | 12/2022 | |
| ES | 2818252 | T3 | * | 4/2021 | ......... H01R 13/6273 |
| GB | 1134653 | A | * | 11/1968 | |
| GB | 2310326 | A | * | 8/1997 | ............ H01R 25/14 |
| GB | 2377093 | A | * | 12/2002 | ............ H01R 25/14 |
| KR | 20210134780 | A | * | 11/2021 | |
| WO | WO-9512909 | A1 | * | 5/1995 | ............ H02G 5/06 |
| WO | WO-2005025011 | A1 | * | 3/2005 | .......... H01R 25/142 |
| WO | WO-2012000731 | A1 | * | 1/2012 | ............ H02G 5/007 |
| WO | WO-2012038167 | A1 | * | 3/2012 | ............ H02G 5/002 |
| WO | WO-2014111441 | A1 | * | 7/2014 | .......... H01R 25/162 |

OTHER PUBLICATIONS

DE102008056484_English_translation (Year: 2008).*
DE102014202699_English_Translation (Year: 2014).*
Suuplementary Search Report from related European Patent Application No. 21837279 issued Apr. 24, 2024.

* cited by examiner

Ingress Protection (IP) Ratings Chart

Ingress Protection → | IP | 5 | 4 |

Solid Foreign Object Protection

| | |
|---|---|
| 0 | No Protection |
| 1 | Protected Against Solid Objects Over 50 mm |
| 2 | Protected Against Solid Objects Over 12 mm |
| 3 | Protected Against Solid Objects Over 2.5 mm |
| 4 | Protected Against Solid Objects Over 1 mm |
| 5 | Protected Against Dust |
| 6 | Totally Protected Against Dust |

Water Ingress Protection

| | |
|---|---|
| 0 | No Protection |
| 1 | Protected Against Vertically Falling Drops of Water or Condensation |
| 2 | Protected Against Direct Sprays of Water Up to 15° from Vertical |
| 3 | Protected Against Sprays of Water up to 60° from Vertical |
| 4 | Protected Against Water Splashed from Any Direction |
| 5 | Protected Against Low Pressure Jets of Water from Any Direction |
| 6 | Protected Against Strong Jets of Water from Any Direction |
| 7 | Protected Against Immersion up to 1 Meter for 30 Minutes |
| 8 | Protected Against Complete Continuous Submersion in Water |

FIG. 4A

| First Digit | Effective Against | Test Description |
|---|---|---|
| 0 | | No Protection Against Contact and Ingress of Objects |
| 1 | >50mm | Any Large Surface of the Body, Such as the Back of a Hand, but No Protection Against Deliberate Contact with a Body Part |
| 2 | >12.5mm | Fingers or Similar Objects |
| 3 | >2.5mm | Tools, Thick Wires, etc. |
| 4 | >1mm | Most wires, Slender screws, large Ants etc. |
| 5 | Dust Protected | Ingress of Dust is Not Entirely Prevented, but it Must Not Enter in Sufficient Quantity to Interfere with the Satisfactory Operation of the Equipment. |
| 6 | Dust Tight | No Ingress of Dust; Complete Protection Against Contact (Dust-tight). A Vacuum Must be Applied. Test Duration of Up to 8 Hours Based on Airflow. |

FIG. 4B

| Second Digit | Effective Against | Test Description |
|---|---|---|
| 1 | Dripping Water | Test Duration: 10 Minutes<br>Water Equivalent to 1 mm (0.039 in) Rainfall Per Minute |
| 2 | Dripping Water When Tilted at 15° | Test Duration: 2.5 Minutes for Every Direction of Tilt (10 Minutes Total)<br>Water Equivalent to 3 mm (0.12 in) Rainfall Per Minute |
| 3 | Spraying Water | For a Spray Nozzle:<br>Test Duration: 1 Minute Per Square Meter for At Least 5 Minutes[4]<br>Water Volume: 10 Liters per Minute (0.037 impgal/s)<br>Pressure: 50-150 kPa (7.3– 21.8 psi)<br>For an Oscillating Tube: Test Duration: 10 Minutes Water<br>Volume: 0.07 Liters Per Minute (0.00026 impgal/s) Per Hole |
| 4 | Splashing Water | Oscillating Tube: Test Duration: 10 Minutes, or Spray Nozzle<br>(Same as IPX3 Spray Nozzle with the Shield Removed) |
| 5 | Water Jets | Test Duration: 1 Minute Per Square Meter for At Least 3 Minutes<br>Water Volume: 12.5 Liters Per Minutes Pressure: 30 kPa (4.4 psi)<br>at Distance of 3 Meters (9.8 ft) |
| 6 | Powerful Water Jets | Test Duration: 1 Minute Per Square Meter for At Least 3 Minutes<br>Water Volume: 100 Liters Per Minute (0.37 impgal/s)<br>Pressure: 100 kPa (15 psi) at Distance of 3 Meters (9.8 ft) |

FIG. 4C

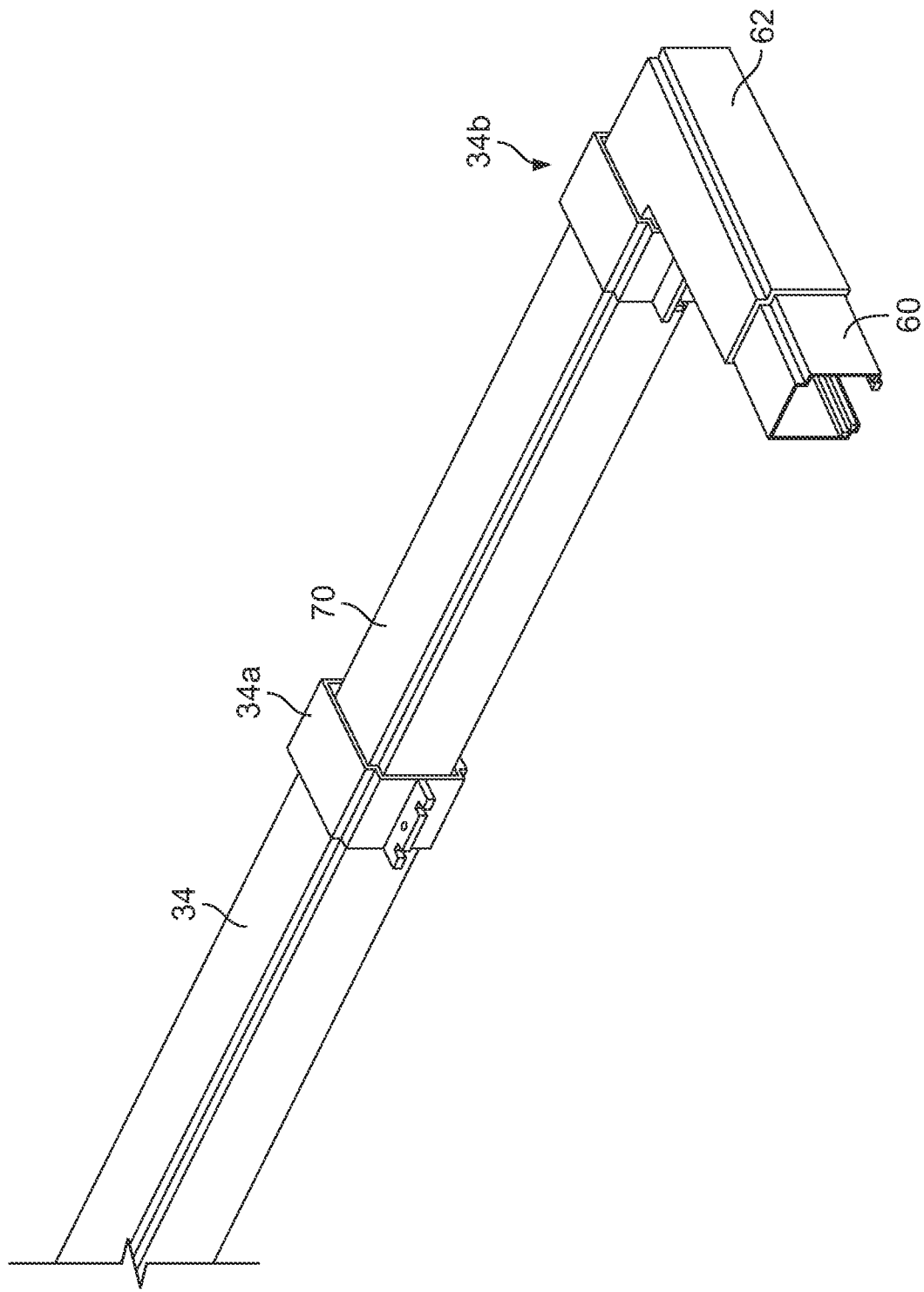

SYSTEMS AND METHODS FOR DUST AND LIQUID PROTECTED CONTINUOUS ACCESS BUSWAY TRUNKING SYSTEMS

CROSS-REFERENCE TO RELATED APPLICATIONS

This application claims the benefit of commonly assigned U.S. Provisional Patent Application No. 63/048,497, which was filed on Jul. 6, 2020. The entire content of the foregoing provisional application is incorporated herein by reference.

BACKGROUND

1. Technical Field

The present disclosure provides advantageous liquid and dust resistant continuous access busway systems that offer the ability to install electrical distribution plugs at any point throughout the run, thereby allowing the busway to be completely populated with distribution plugs while maintaining a high level of ingress protection. As used herein, continuous access refers to a busway that does not have individual ports for tapping off power.

2. Background Art

Existing busbar truncating systems that are capable of high resistance to liquid and dust offer only a limited number of access points for electrical distribution plugs.

A need exists for the flexibility of continuous access busway systems that accommodates installation of electrical distribution plugs at any point throughout the run, and busway systems that are suitable for use in locations or environments that could subject the system to dust and liquids.

SUMMARY

The disclosed high resistant liquid and dust protected busway system significantly enhances flexibility and utility in the field relative to traditional busway systems. The disclosed busway system supports utilization of various add-ons to an existing system that increases the ingress protection capability of a standard open channel busway well above the industry standard of IP-54 (e.g., NEMA Type 3X standard, or the like).

In exemplary embodiments, the open channel of the disclosed busway allows installation of one or more distribution plugs of various sizes into the channel. The remaining open portions of the busway may then be sealed with press fit closure strip(s). The openings around the distribution plugs may be sealed with a water resistant assembly. The end feed junction boxes which provide power to the system may be sealed utilizing additional components that are configured/dimensioned to seal all remaining openings. The sealing functionalities associated with the present disclosure provide highly advantageous flexibility in the positioning and/or number of add-ons, e.g., distribution plugs, that may be added to the busway while achieving a level of sealing that is suitable for use in challenging environments, e.g., environments that involve high levels of liquid, dust and/or other potential contaminants.

In exemplary embodiments, a bent metal boot may be used to cover a substantial amount of the openings and may be applied to the support plate. A molded channel seal may be used to close off the remaining opening in the top of the housing.

The disclosed liquid and dust resistant continuous access busway system has wide ranging applicability, including specifically in hazardous environments where higher amounts of liquid and dust would be of concern to an electrical distribution system. More generally, the disclosed busway systems have particular utility in various industrial, hazardous, and outdoor applications.

In accordance with embodiments of the present disclosure, an exemplary busway system is provided. The busway system includes a first busway, a second busway, and a joint seal coupling the first busway to the second busway. The first busway includes a first end and an opposing second end. The second busway includes a third end and an opposing fourth end. The joint seal includes panels configured to at least partially slide over the first or the opposing second end of the first busway, and at least partially slide over the third or the opposing fourth end of the second busway to couple the first busway to the second busway. The joint seal creates a seal at a joint formed by the first busway, the second busway, and the joint seal.

The seal created by the joint seal prevents infiltration of dust and liquid through the joint. In some embodiments, the joint formed by the first busway, the second busway, and the joint seal is rated NEMA 3X. The first busway and the second busway can each include a top wall, side walls, and bottom flanges extending from the respective side walls in a spaced manner, the bottom flanges forming a channel therebetween extending into a hollow interior of the first busway and the second busway. The first busway and the second busway can each include a pair of extensions protruding from the top wall and extending parallel to a length of the first busway and the second busway, respectively. In some embodiments, each extension of the pair of extensions can define an L-shaped or a T-shaped configuration.

The busway system can include a coupler including a top surface and side flanges extending from the top surface to define a hollow space therebetween. The coupler is configured to be slidingly positioned over and engaged with the pair of extensions on the first and second busways over the joint formed by the coupler seal. The panels of the joint seal can include a top panel connected to side panels by lateral connecting members, and bottom flanges spaced from each other to align with a channel formed in a bottom surface of the first and second busways. The panels of the joint seal can include a rib configured to limit a depth by which the first and second busways slide into the joint seal.

The busway system can include a coupler seal configured to snap fit over and at least partially receive the coupler. The busway system can include an endfeed including a third busway coupled to the first busway or the second busway, the endfeed providing power to the third busway, the first busway, and the second busway. The busway system can include an endfeed boot positioned around the third busway and encasing one side of the endfeed. The busway system can include one or more tap off boxes mechanically and electrically coupled within a channel of the first busway or the second busway. The busway system can include an endcap seal including top, side and bottom plates configured to be at least partially inserted within a hollow interior of the first busway or the second busway. The busway system can include an endcap configured to fit over a protruding end of the endcap seal, and at least partially fit over the first end or the second opposing end of the first busway, or the third end or the opposing fourth end of the second busway.

According to embodiments of the present disclosure, an exemplary method for assembling a busway system is provided. The method includes at least partially sliding panels of a joint seal over a first end or an opposing second end of a first busway. The method includes at least partially sliding the panels of the joint seal over a third end or an opposing fourth end of a second busway to couple the first busway to the second busway. The joint seal creates a seal at a joint formed by the first busway, the second busway, and the joint seal.

The method includes sliding a coupler over a pair of extensions protruding from a top wall of the first and second busways, the coupler positioned over the joint formed by the first busway, the second busway, and the joint seal. The method includes snap fitting a coupler seal over the coupler. The method includes coupling a third busway of an endfeed to the first busway or the second busway, the endfeed providing power to the third busway, the first busway and the second busway.

Additional features, functions and benefits of the disclosed busway systems will be apparent from the detailed description which follows, particularly when read in conjunction with the appended figures.

BRIEF DESCRIPTION OF FIGURES

To assist those of ordinary skill in the art in making and using the disclosed busway systems, reference is made to accompanying figures, wherein:

FIG. 4A, FIG. 4B and FIG. 4C each provide information concerning applicable rating systems, with FIG. 4A providing an ingress protection (IP) ratings chart, FIG. 4B providing a description of a first digit of the IP rating, and FIG. 4C providing a description of a second digit of the IP rating;

FIG. 10A, FIG. 1013 and FIG. 10C depict assembly of portions of a busway;

DESCRIPTION OF EXEMPLARY EMBODIMENTS

As described herein, liquid and dust resistant continuous access busway systems are provided that offer the ability to install electrical distribution plugs at any point between joints throughout a busway run, thereby allowing the busway to be completely populated with distribution plugs while maintaining a high level of ingress protection, e.g., in challenging environments where liquid, dust and/or other contaminants are likely to be encountered. In exemplary embodiments of the present disclosure, the disclosed busway system satisfies at least the following criteria: (i) provides protection from water splashed/sprayed from all directions (i.e., 360° protection), (ii) provides protection against dust and/or debris, (iii) functions in a manner consistent with the operational requirements of an open channel busway, (iv) does not impede use and/or operation of an associated hanger system for the busway, and (v) does not affect the pluggable space of the busway system.

In some exemplary embodiments of the present disclosure, the plug-in units/enclosures are rated (at a minimum) NEMA 3R. In some exemplary embodiments of the present disclosure, the plug-in units/enclosures are rated (at a minimum) NEMA 3X. For example, plug-in units/enclosures generally include, but are not limited to, wireless communications, network connectivity and the like. To ensure rating compliance, drop cords and/or receptacles associated with the disclosed busway system are advantageously protected in like manner to the busway system. In exemplary embodiments, the disclosed system (when assembled with plug-ins) maintains a minimum rating of IP54. FIGS. 4A-4C provide relevant information for rating purposes, including the ingress protection (IP) ratings chart of FIG. 4A with code identification for solid foreign object protection and water ingress protection.

With further reference to the figures, exemplary implementations of the present disclosure are provided. Specifically, FIGS. 1, 2 and 3 provide schematic depictions of open channel busways with add-on component/distribution plugs mounted with respect thereto.

Figure 1:
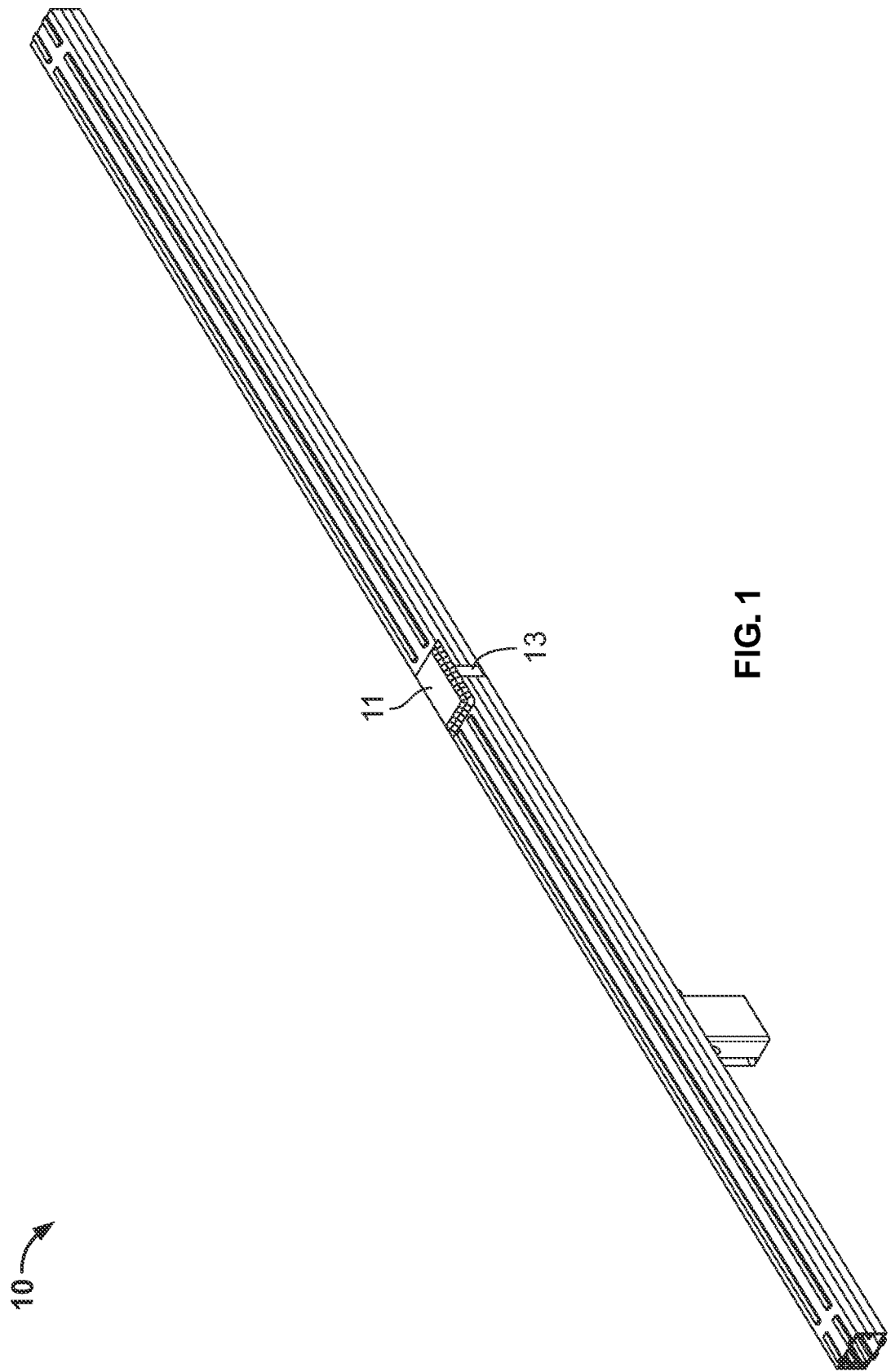
FIG. 1 is a depiction of an open channel busway that includes exemplary seals associated with a joint coupler seal, and a busway housing joint seal.

With initial reference to FIG. 1, a busway 10 (e.g., a busbar) is schematically depicted with a seal for the joint coupler 11 and a further seal for the busway housing joint 13. The seal for the joint coupler 11 is advantageously secured relative to the top of the joint to seal it off, whereas the seal for the busway housing joint 13 functions as an intermediary seal between busway housings.

Figure 2:
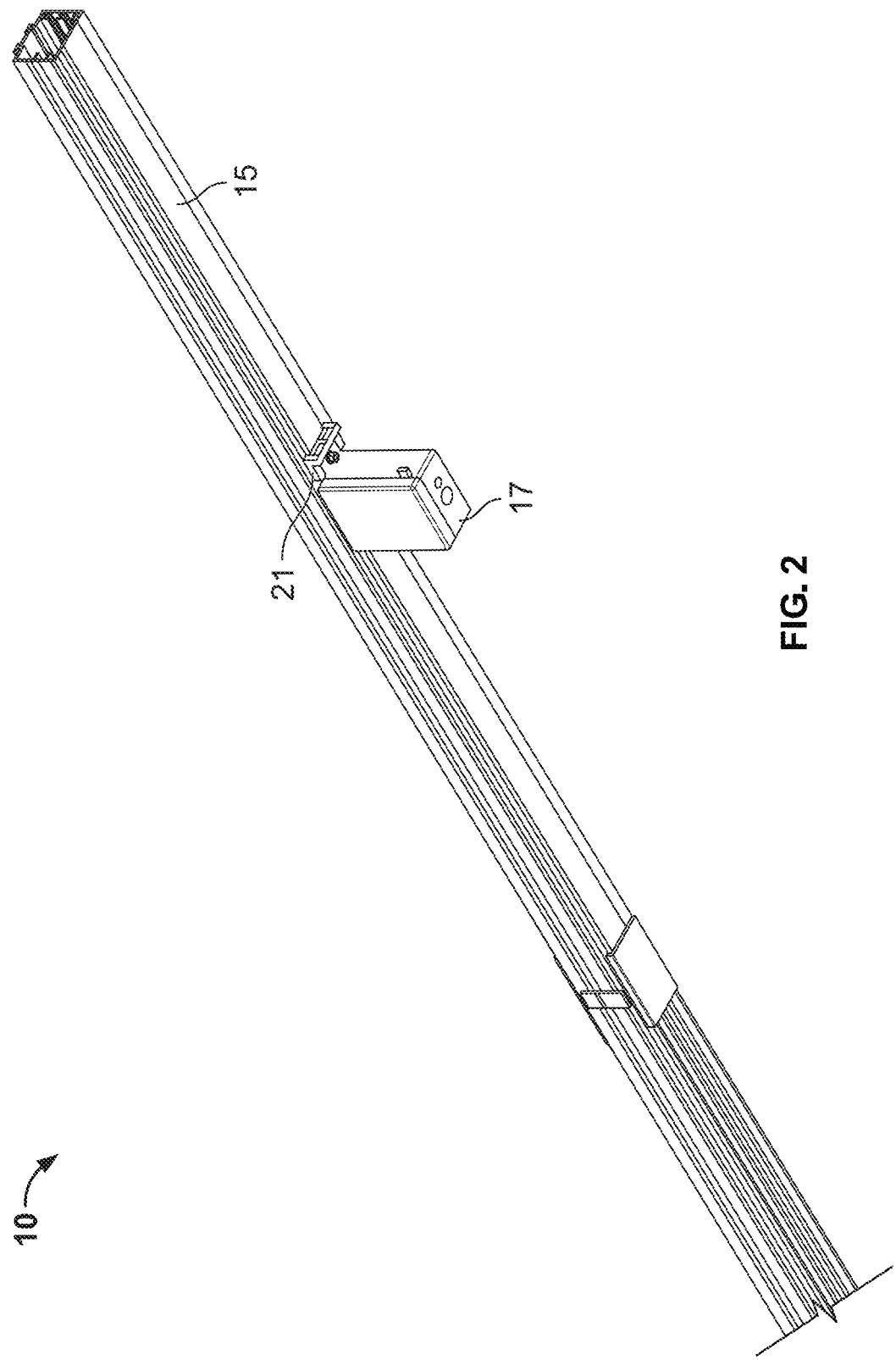
FIG. 2 is a depiction of an open channel busway with an add-on component/distribution plug mounted with respect thereto, with a closure strip providing sealing functionality to the busway adjacent the add-on component and a water resistant assembly that seals openings associated with the add-on component/distribution plug.

As shown in FIG. 2, an elongated press fit closure strip 15 is mounted with respect to the busway 10 adjacent to an add-on component/distribution plug 17 to close off an elongated channel or opening 21 of the busway 10, and to provide sealing functionality to the busway 10 adjacent the add-on component. As also shown in FIG. 2, a water resistant snap-in assembly 21 is mounted to relative to the press fit closure strip 15 and the add-on component/distribution plug 17 to seal openings associated therewith.

Figure 3:
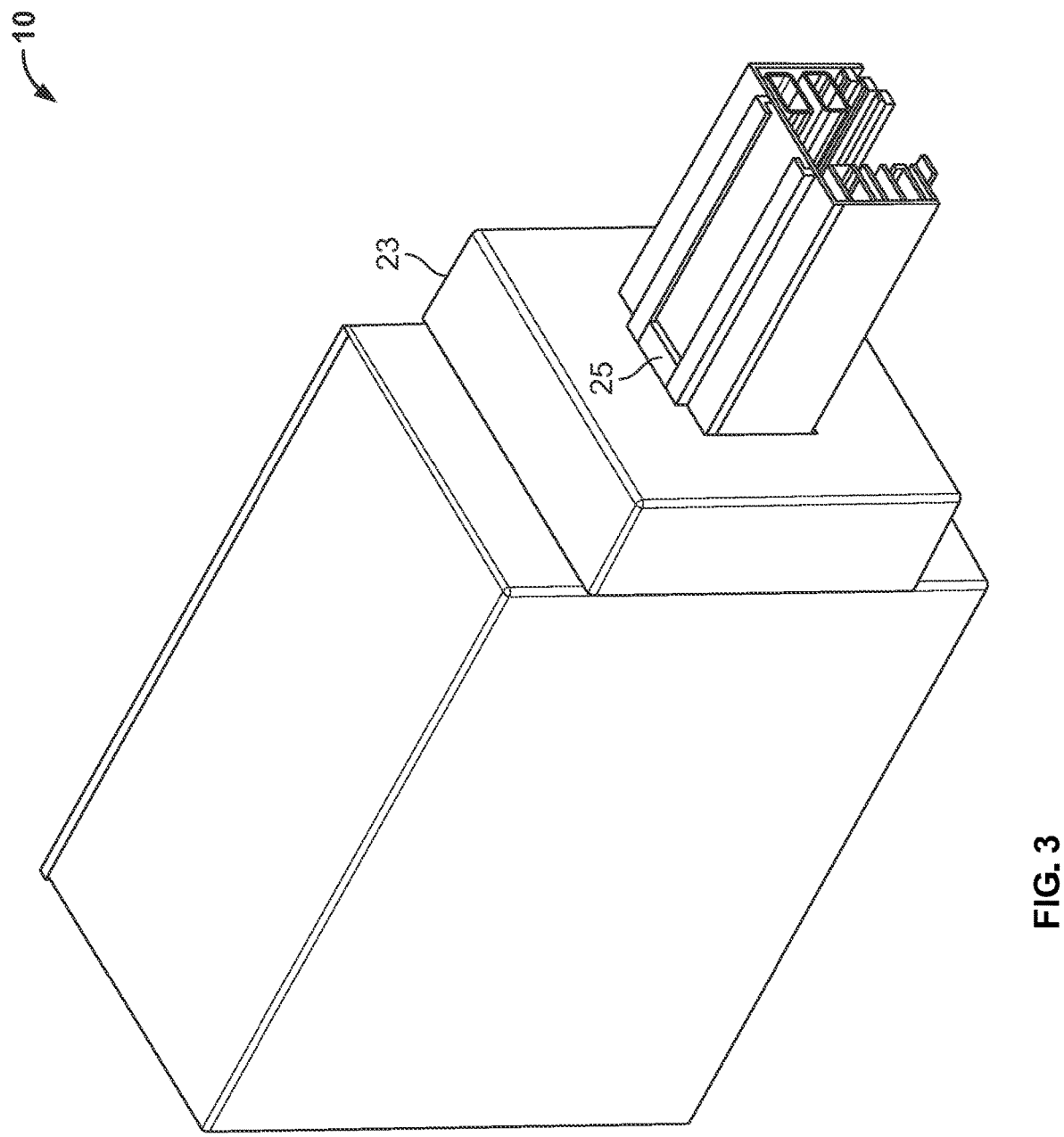
FIG. 3 is a depiction of an open channel busway with a bent metal boot covering a substantial amount of the openings and a channel seal closing off the remaining openings.

FIG. 3 shows an open channel busway 10 with a bent metal boot 23 that covers a substantial amount of the openings of the busway 10, and a channel seal 25 closing off the remaining openings, seams or cracks in-between components of the busway 10, thereby preventing or reducing dust and liquid infiltration.

Figure 5A:
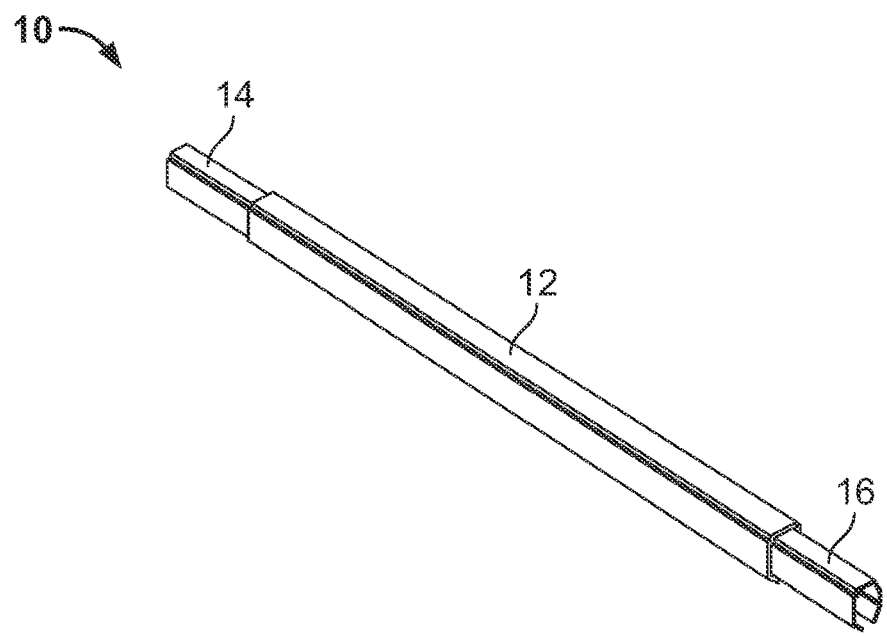
FIG. 5A and FIG. 5B depict a straight portion of busway with a sleeve positioned around a segment thereof.
Figure 5B:
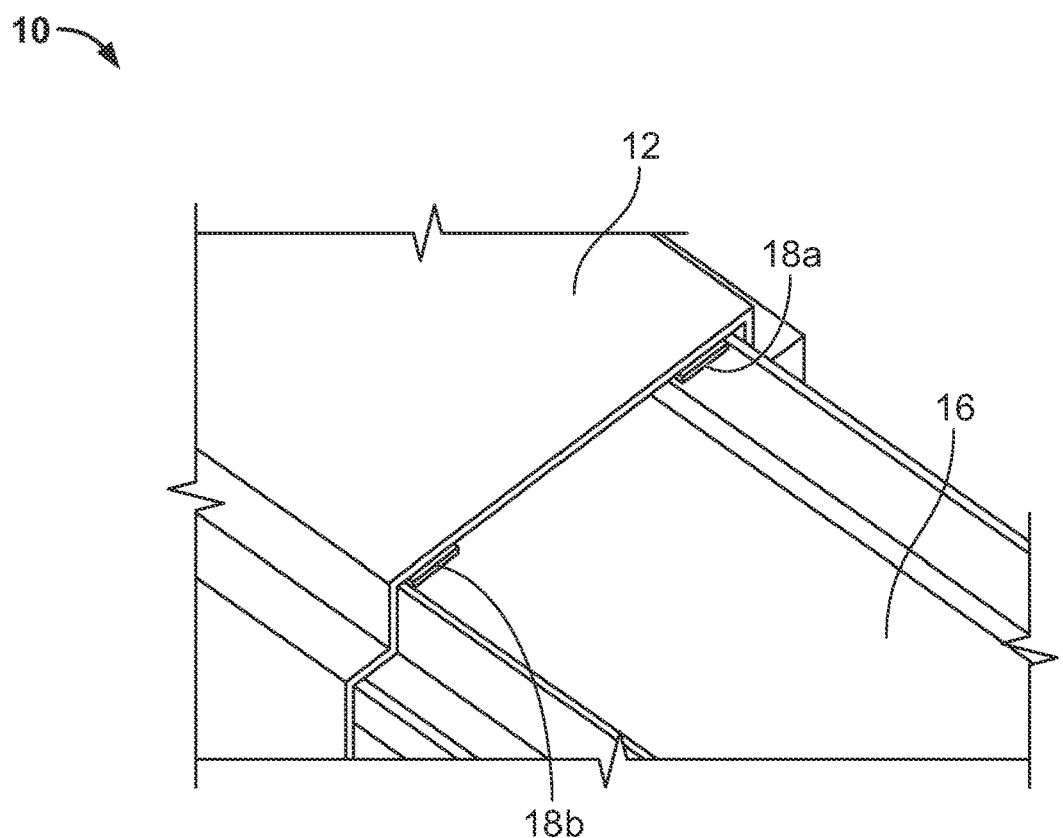

With reference to FIGS. 5A and 5B, a straight section of busway 10 is schematically depicted with a sleeve 12 positioned around a portion thereof. The sleeve 12 is generally dimensioned to extend for a length that leaves a portion of the busway 10 uncovered by the sleeve 12 on each side (i.e., uncovered sections 14, 16 on opposing sides of the sleeve 12). The lengths of the uncovered sections 14, 16 of busway 10 may be the same or different from each other, although such uncovered sections 14, 16 are generally of comparable dimension. An exemplary length for the uncovered sections 14, 16 of busway 10 can be about 15 inches, although the present disclosure is not limited by or to such exemplary length. The sleeve 12 is generally secured to busway 10, e.g., by way of adhesive or the like. In an exemplary embodiment of the present disclosure, one or more segment(s) of two-sided tape 18a, 18b may be positioned between the sleeve 12 and the busway 10 at either end of the sleeve 12. Alternative techniques/mechanisms for fixing the sleeve 12 relative to the busway 10 may be employed, as will be apparent to persons skilled in the art.

Figure 6A:
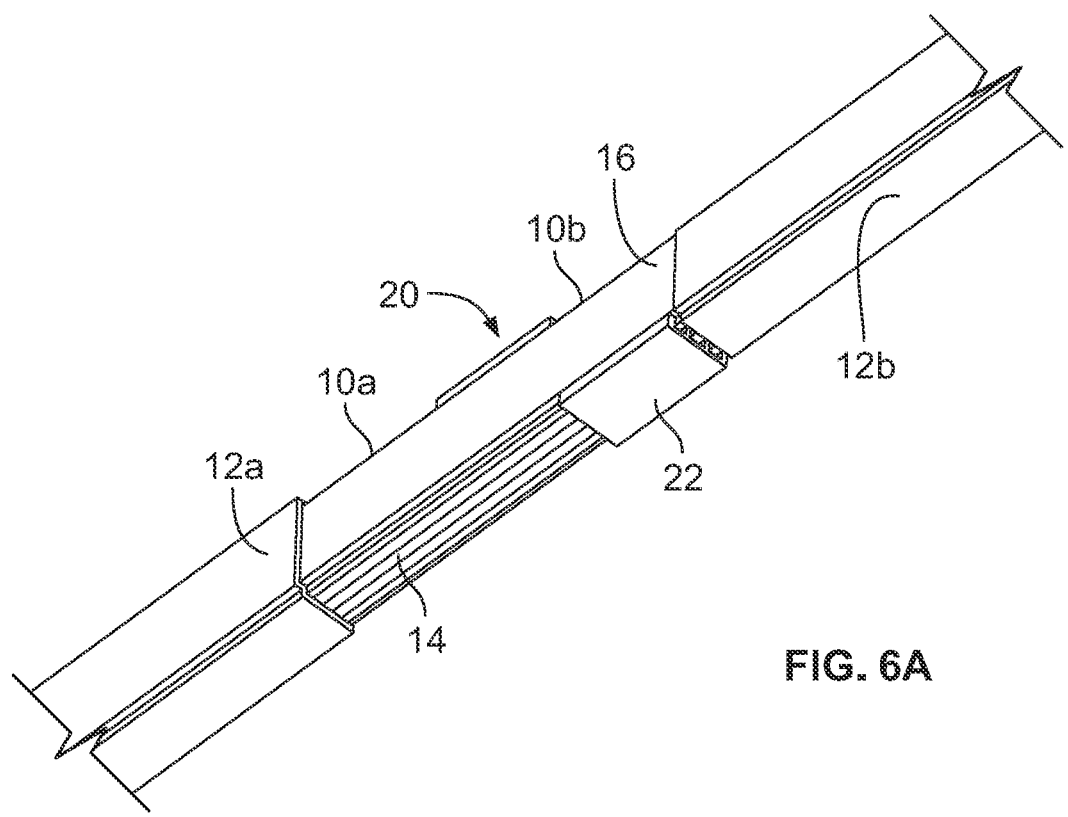
FIG. 6A and FIG. 6B depict two straight busway portions coupled to each other by a coupler.
Figure 6B:
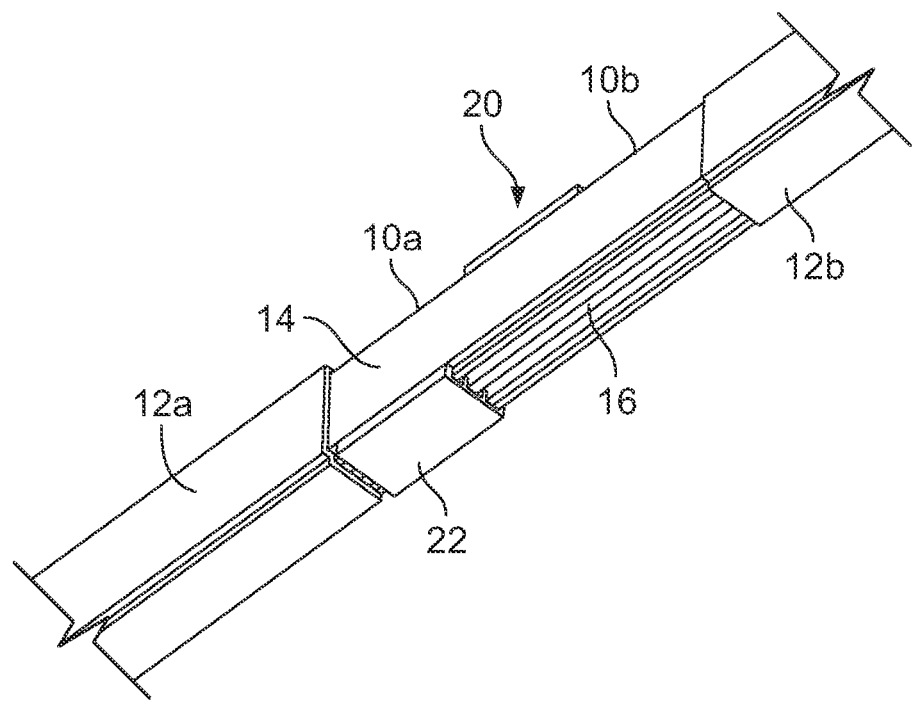

Turning to FIGS. 6A and 6B, a coupler 20 functions to connect and secure/couple the first and second straight busway portions 10a, 10b to each other. At least a portion of the endpoints of the busway portions 10a, 10b are received by and retained within a complementary hollow section of the coupler 20 to join the opposing busway portions 10a, 10b. Each of the straight busway sections 10a, 10b are covered in part by sleeves 12a, 12b, respectively. The sleeves 12a, 12b leave uncovered end sections 14, 16 of the respective straight busway portions 10a, 10b, and such uncovered end sections 14, 16 allow a bottom coupler 22 to move for joint insertion.

Figure 7A:
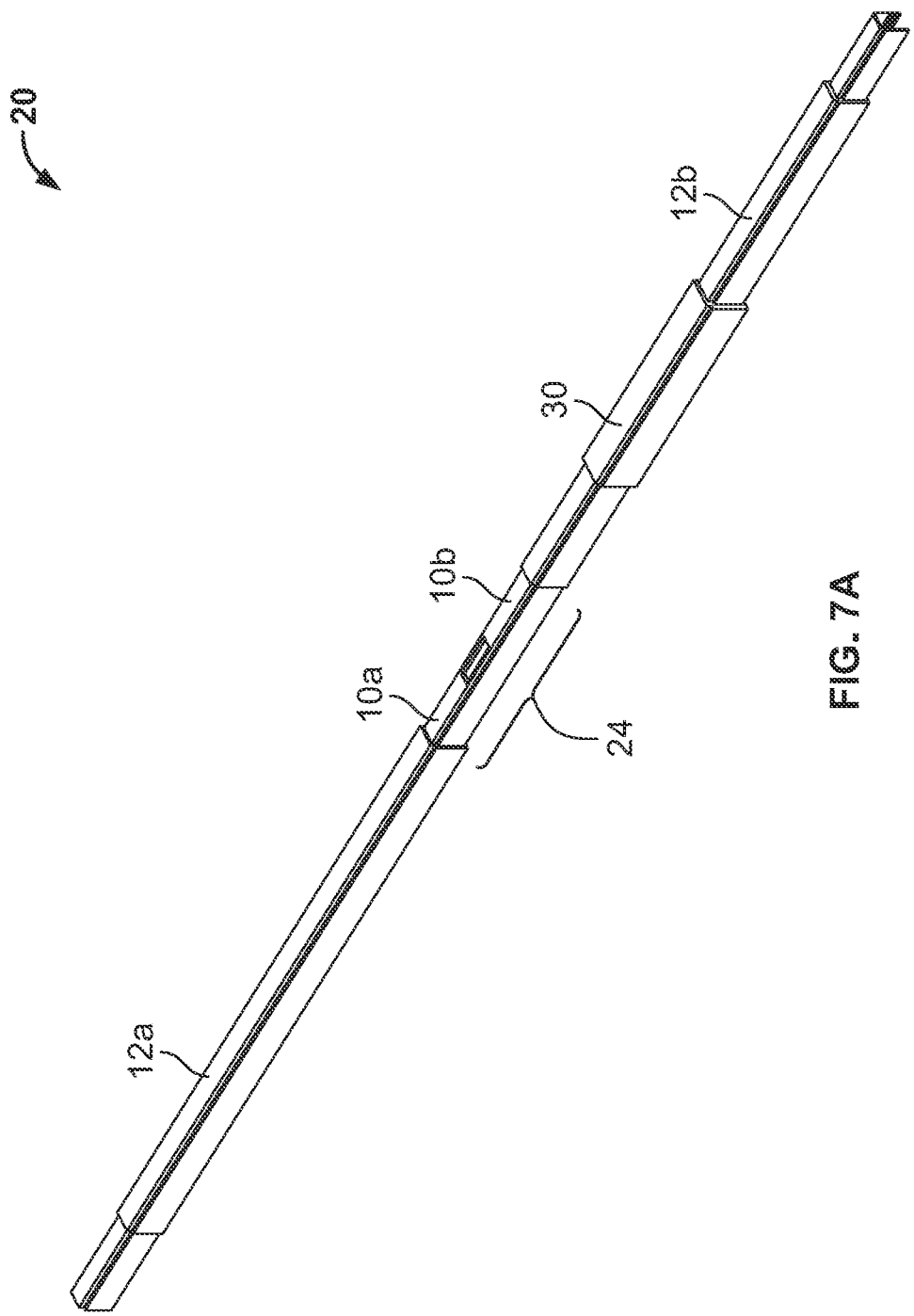
FIG. 7A and FIG. 7B depict a joint sleeve sealing a coupling region between first and second busway portions.
Figure 7B:
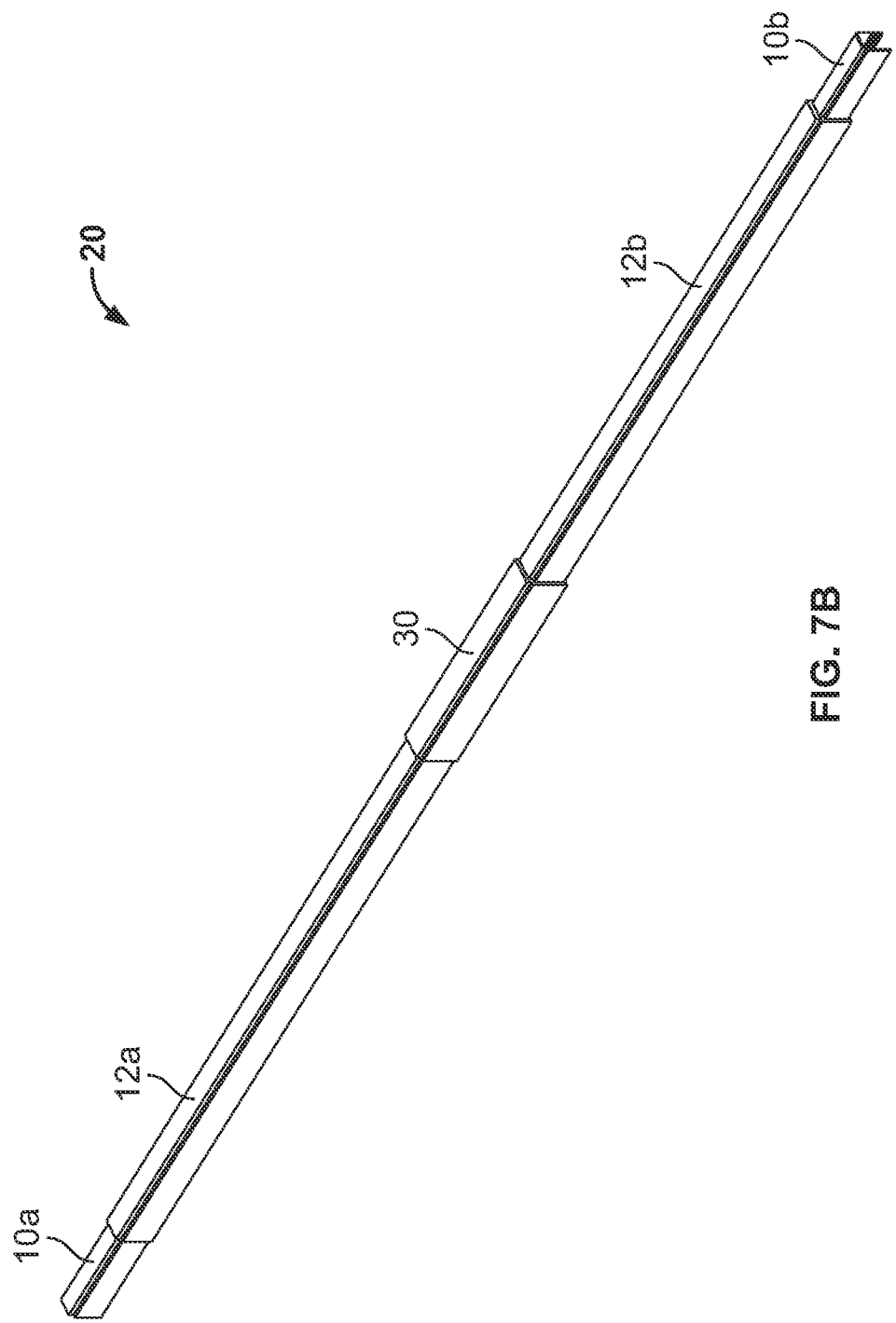

With reference to FIGS. 7A and 7B, the coupling region 24 between the straight busway sections 10a, 10b is advantageously sealed by a joint sleeve 30 that is slidably movable along the exterior of one of the sleeved busway sections (e.g., the joint sleeve 30 is capable of sliding along the exterior of sleeves 12a, 12b). As shown in FIG. 7A, joint sleeve 30 is initially spaced from the coupling region 24, but is moved along the sleeved busway section (i.e., sleeve 12a or sleeve 12b) until the joint sleeve 30 overlays the coupling region 24 as shown in FIG. 7B. The joint sleeve 30 advantageously overlays the sleeved busway sections (e.g., the combination of busway 10a and sleeve 12a, and the busway 10b and sleeve 12b) at opposed ends of the joint sleeve 30.

Thus, the length of joint sleeve 30 is sufficiently long to fully cover the coupling region 24 and to extend to a limited extent over the sleeve 12a, 12d portion of the opposed coupled busway sections. The joint sleeve 30 therefore covers in their entirety the coupler 20, the exposed sections 14, 16, and at least partially covers the ends of the sleeves 12a, 12b. The joint sleeve 30 can generally be centered on the coupling region 24 in its final sealing position.

Figure 8A:
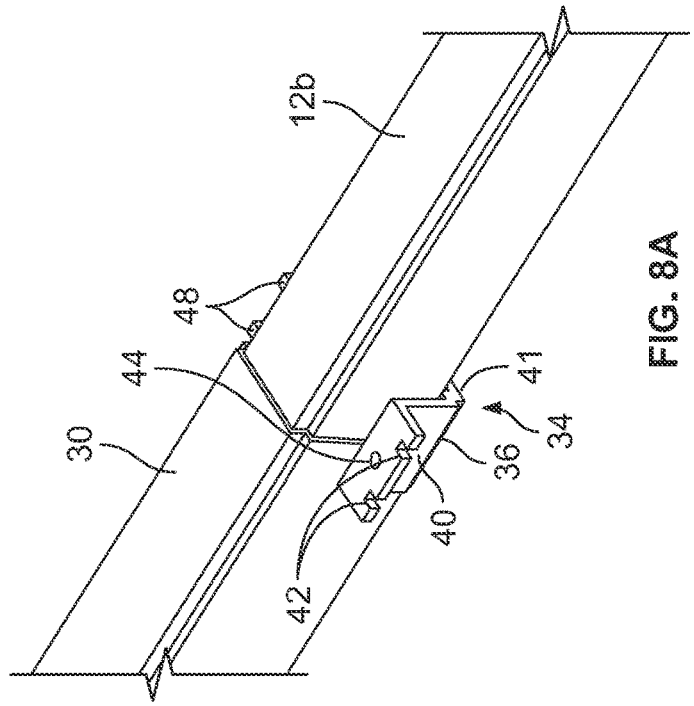
FIG. 8A and FIG. 8B depict a joint seal unit being applied to a sleeved busway and a joint sleeve.
Figure 8B:
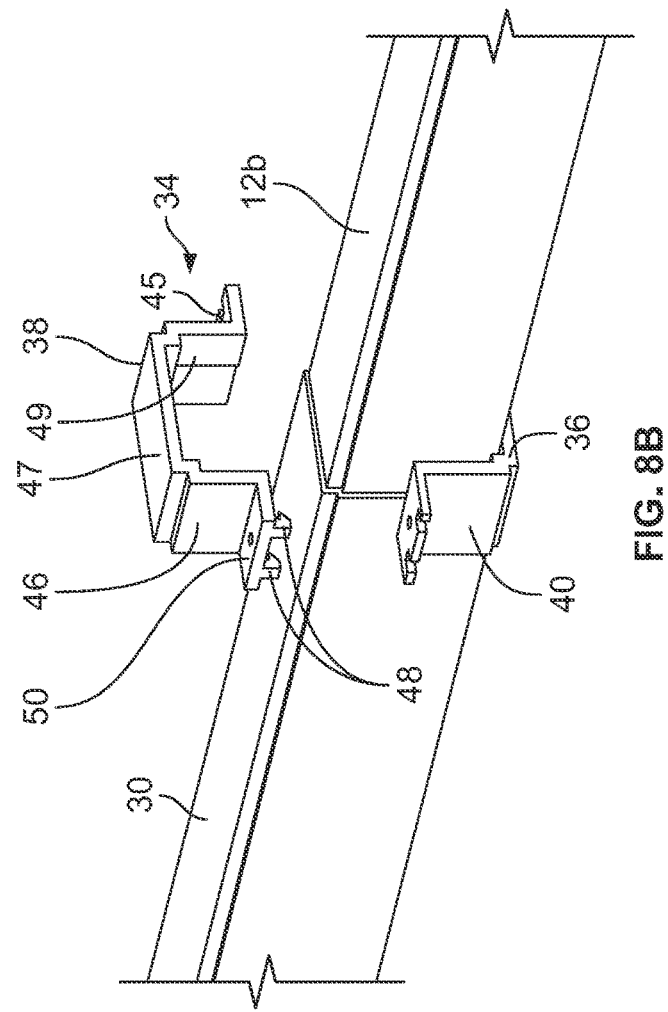

As shown in FIGS. 8A and 8B, a joint seal unit 34 is mounted with respect to the busway assembly to seal the opening between the joint sleeve 30 and the sleeved busway portion (i.e., the combined busway 10b and sleeve 12b). In the exemplary embodiment of FIGS. 8A and 8B, the joint seal unit 34 includes a first U-shaped bracket member 36 and a second U-shaped bracket member 38. The bracket members 36, 38 are configured and dimensioned to engage the exterior of the joint sleeve 30 and the sleeved busway portion over sleeve 12b. In exemplary embodiments of the present disclosure, the two bracket members 36, 38 can be identical, i.e., they are interchangeable. Either bracket member 36, 38 can therefore be used as a bottom of the bracket assembly or the top of the bracket assembly, simplifying the assembly process. As shown in FIGS. 8A and 8B, on the visible side, the first bracket member 36 includes an L-shaped flange portion 40 that defines a pair of grooves 42 along a distal edge thereof and a centrally positioned aperture 44 formed in the outwardly extending flange section (e.g., a horizontally extending section). The horizontally extending section can extend substantially perpendicularly from the vertically extending section of the L-shaped flange portion 40. The bracket member 36 includes a central connecting section 41 that joins the L-shaped flange portion 40 with extensions 43 configured and dimensioned to be at least partially inserted into and engaged or interlocked with grooves 45 of the second bracket member 38. The second bracket member 38 includes a cooperatively dimensioned L-shaped flange portion 46 that defines two downwardly directed extensions 48 (e.g., interlocking or engaging pins) that are configured and dimensioned to be at least partially inserted into and engaged or interlocked with the grooves 42 of first bracket member 36. Second bracket member 38 also defines a central aperture 50 that aligns with aperture 44 of the first bracket member 36 when the two bracket members 36, 38 are engaged around the joint sleeve 30 and the sleeved busway portion. The bracket member 38 includes a central connecting section 47 that joins the flange portions 46 to an L-shaped bracket 49 including grooves 45 configured to engage with the extensions 43 of the bracket member 36. The first and second bracket members 36, 38 generally include internal gasketing to seal against the outer surfaces of the joint sleeve 30 and the sleeved busway portion. The gasketing may be adhered to at least a portion of the inner surface of the first/second bracket members 36, 38, or may be an independent component that is positioned therewith. Once engaged with each other, the first/second bracket members 36, 38 may be attached relative to each other, e.g., by a nut/bolt arrangement (not pictured) through aligned apertures 44, 50 (on both sides of the bracket members 36, 38). The nut/bolt attachment advantageously compresses the internal gasketing, thereby enhancing the sealing between the joint seal unit 30 and the sleeved busway (10b, 12b). Comparable bracketing is put in place on the opposite end of the joint seal unit 30 (not pictured) and in other transition regions along the disclosed busway.

Figure 9A:
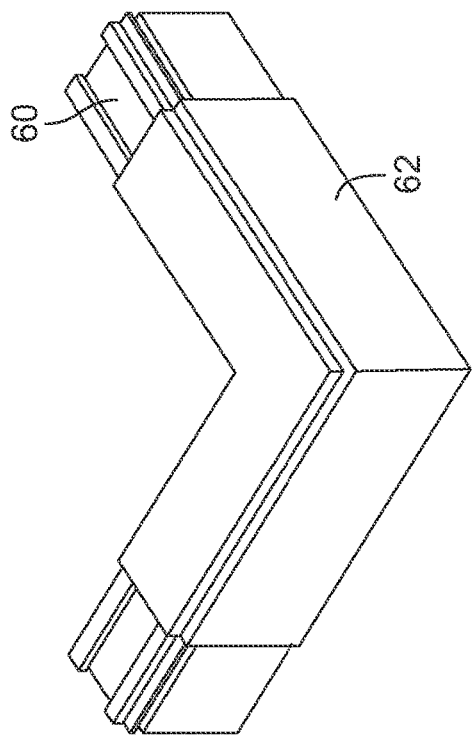
FIG. 9A and FIG. 9B depict an elbow portion of a busway that is sleeved.
Figure 9B:
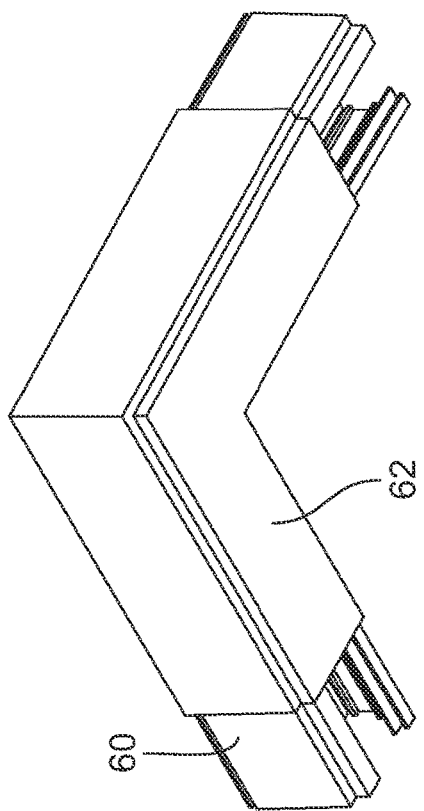

As shown in FIGS. 9A and 9B, an elbow portion 60 capable of being used with the busway 10 is depicted with an L-shaped sleeve 62 positioned thereover. Although FIGS.

9A and 9B depict elbow geometries, it should be understood that similar sleeving techniques would be undertaken in other busway junctures, e.g., tees, as will be apparent to persons skilled in the art. In exemplary embodiments, sleeve 62 may be assembled with appropriate cut pieces of housing sleeve material (e.g., sleeve portions 12a and 12b may be cut so as to accommodate the L-shaped geometry of an elbow portion 60 in the busway. The protective sleeve 62 typically runs the same length as conventional limiting strips, as are known in the art. Sleeve 62 is generally secured with respect to the elbow portion 60 of the busway with an adhesive (e.g., double-sided tape, adhesive, or the like) and may be sealed relative to the elbow portion 60 with an epoxy.

Figure 10A:
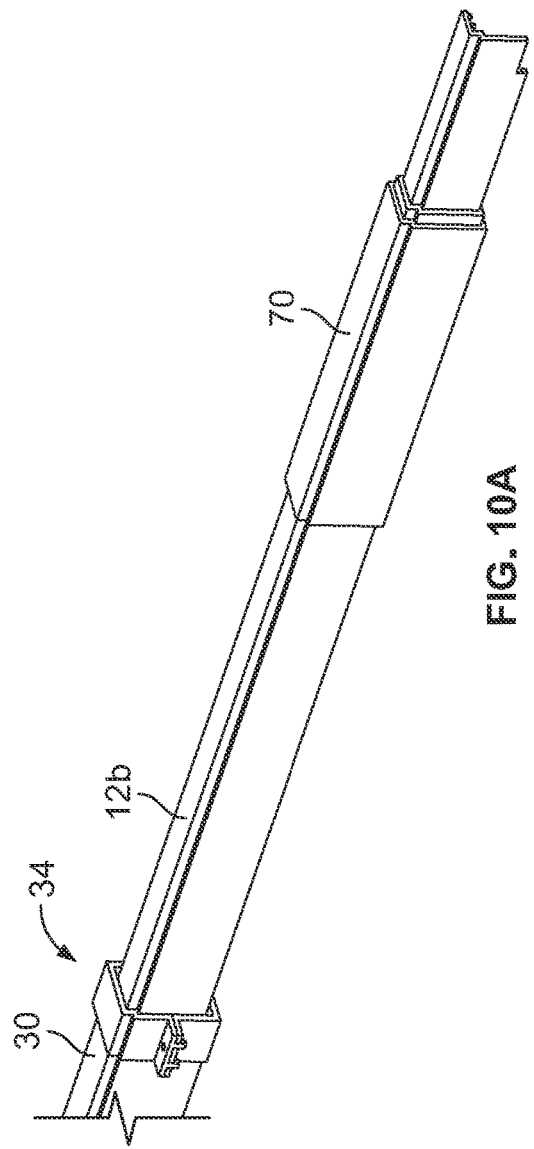
Figure 10B:
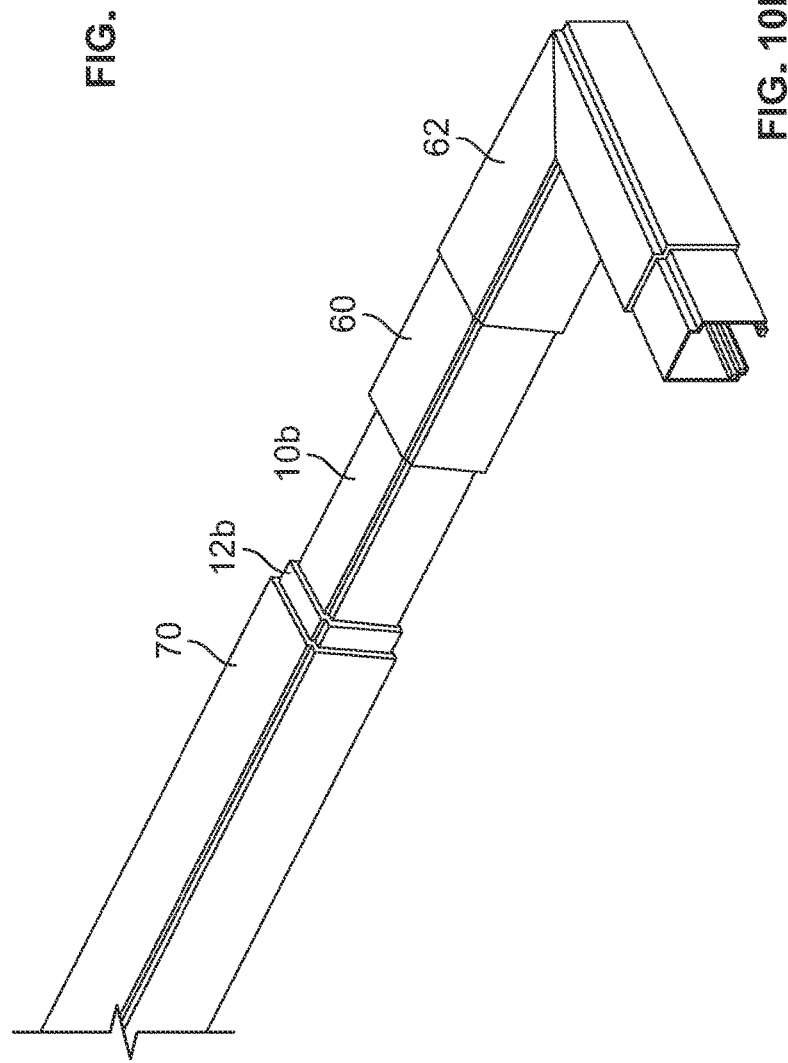

FIGS. 10A-10C schematically depict assembly of an elbow portion 60 covered, in part, by sleeve 62 with a straight, sleeved straight busway portion (i.e., busway 10b in combination with sleeve 12b). As with the joint region 24 described above with reference to FIGS. 7A and 7B, the sleeved elbow busway portion 60, 62 may initially be joined to the straight sleeved busway portion 10b, 12b and a joint coupler 70 may be slid to cover the non-sleeved region therebetween. Once the joint coupler 70 is in proper position relative to the sleeved elbow busway portion 60, 62 and the straight sleeved busway portion 10b, 12b (i.e., the joint coupler 70 is positioned to cover all non-sleeved extension regions of both busway portions (busway 10b and elbow portion 60), then bracket assemblies 34a, 34b may be secured at the joints with the joint coupler 70 as described above with reference to bracket assembly 34. Internal gasketing member(s) can contribute to the sealing functionality of the bracket assemblies 34a, 34b.

Figure 11A:
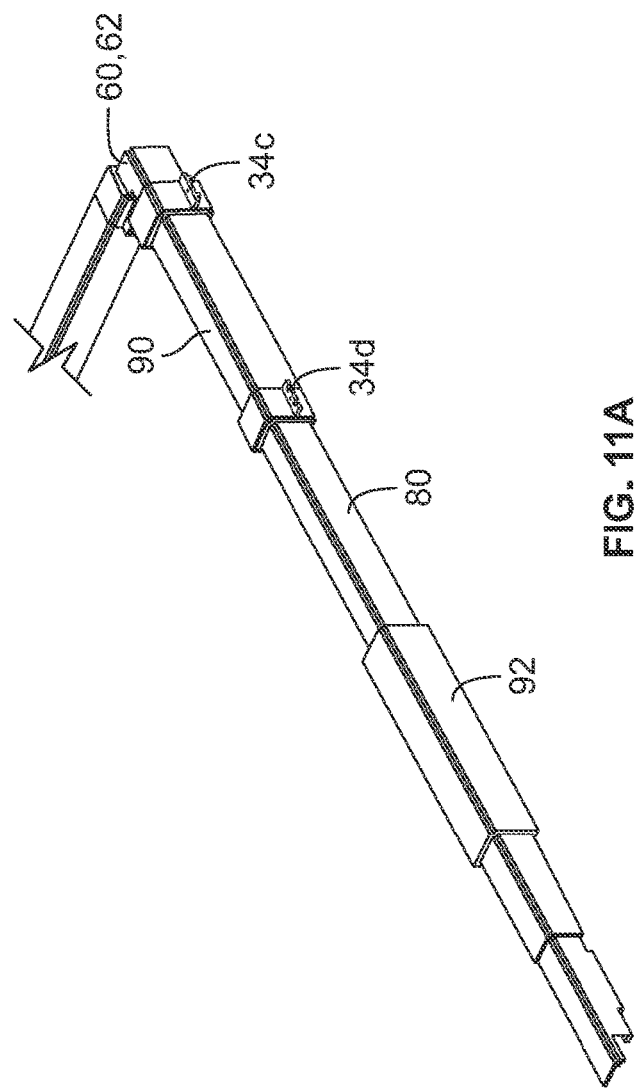
FIG. 11A, FIG. 11B and FIG. 11C depict assembly of the previously referenced busway portions to further busway portions and an endfeed stub.
Figure 11B:
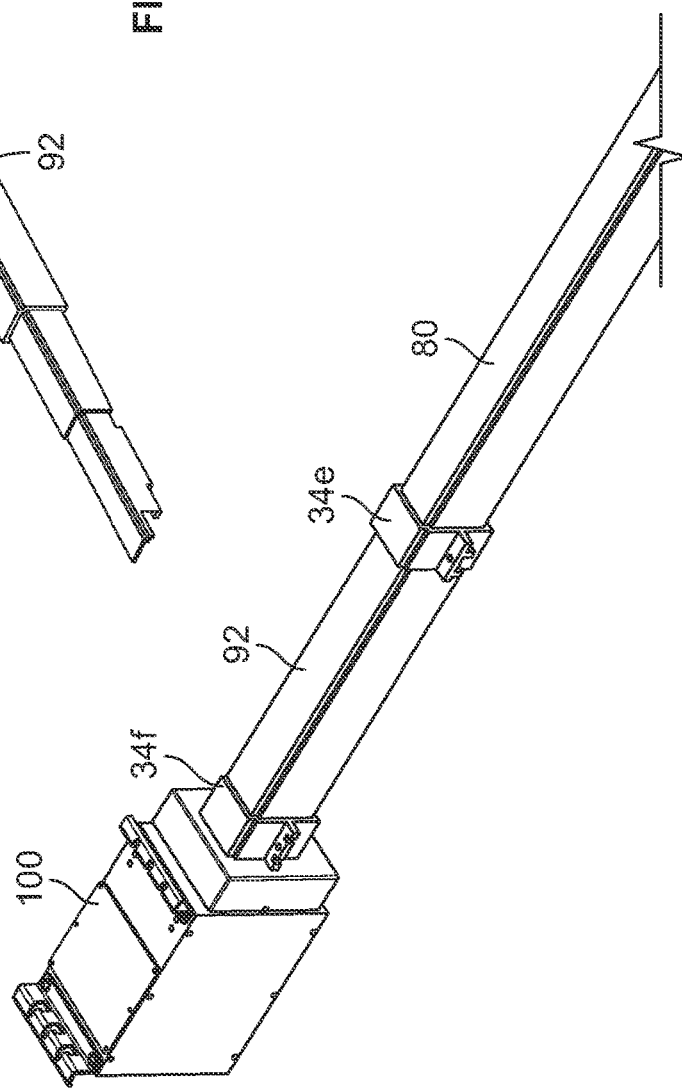
Figure 11C:
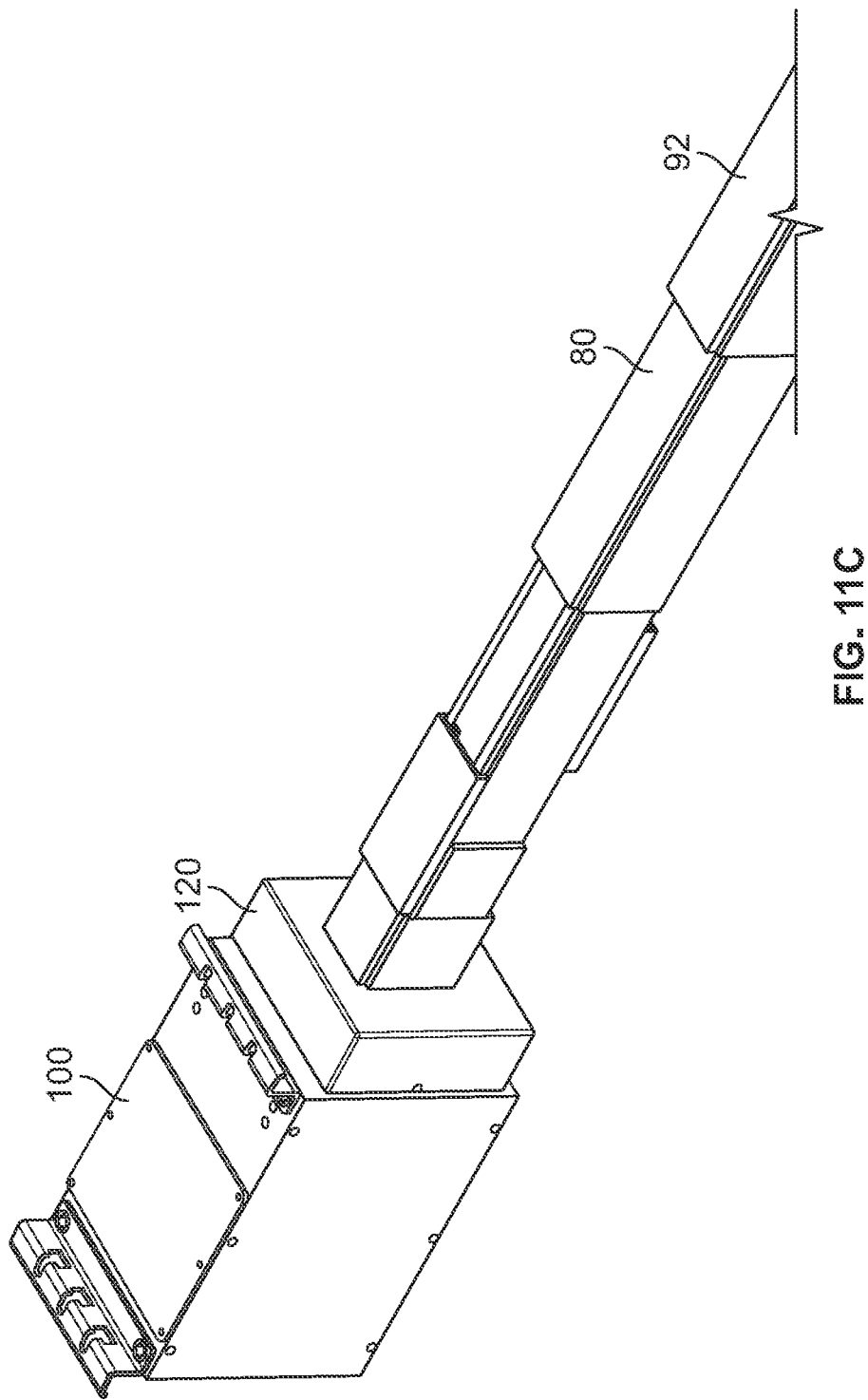

Turning to FIGS. 11A-11C, further assembly of a busway system according to the present disclosure is schematically depicted. In particular, as shown in FIG. 11A, elbow busway portion 60, 62 (e.g., elbow assembly) may be joined to additional busway portions. Indeed, the present disclosure provides almost infinite flexibility in assembling an effective busway system for use in environments exposed to potentially damaging elements, e.g., liquid, dust and the like. Thus, an additional straight sleeved busway portion 80 can be joined to elbow busway portion 60,62 and the exposed region can be covered by joint seal unit 90 in the same manner described above for joint seal unit 70. Opposite ends of joint seal unit 90 are secured relative to the underlying busway portions by bracket assemblies 34c, 34d. As also shown in FIG. 11A, an additional joint seal unit 92 can be positioned "at-the-ready" over sleeved straight busway portion 80, pending attachment of busway portion 80 to a further busway component.

As shown in FIGS. 11B and 11C, the free end of sleeved straight busway portion 80 can be secured relative to an endfeed/stub 100. Once the endfeed stub 100 is joined to sleeved straight busway portion 80, the joint seal unit 92 is slid over the exposed region therebetween and bracket assemblies 34e, 34f (FIG. 11B) are applied to the junction regions to maintain a sealed position of the joint seal unit 92 relative to the busway portion 80. Internal gasketing enhances sealing therebetween. An endfeed boot 120 can be secured to the endpoint of the busway between the joint seal unit 92 and the endfeed/stub 100.

Figure 12A:
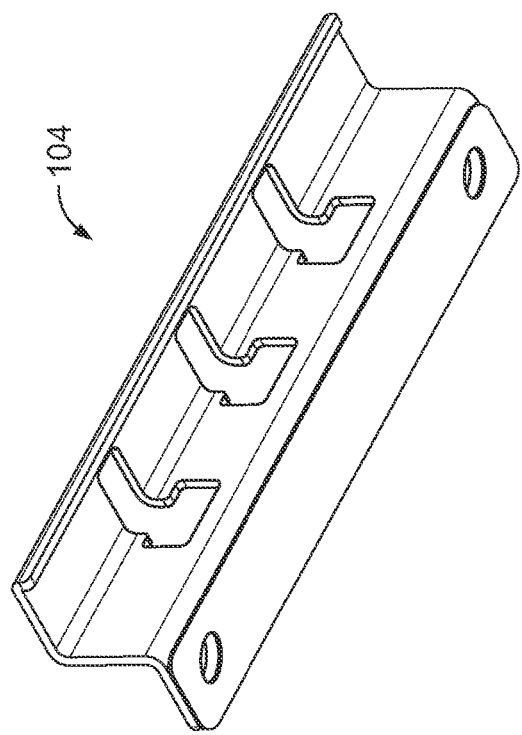
FIG. 12A, FIG. 12B and FIG. 12C depict components used to assemble an endfeed/stub.
Figure 12B:
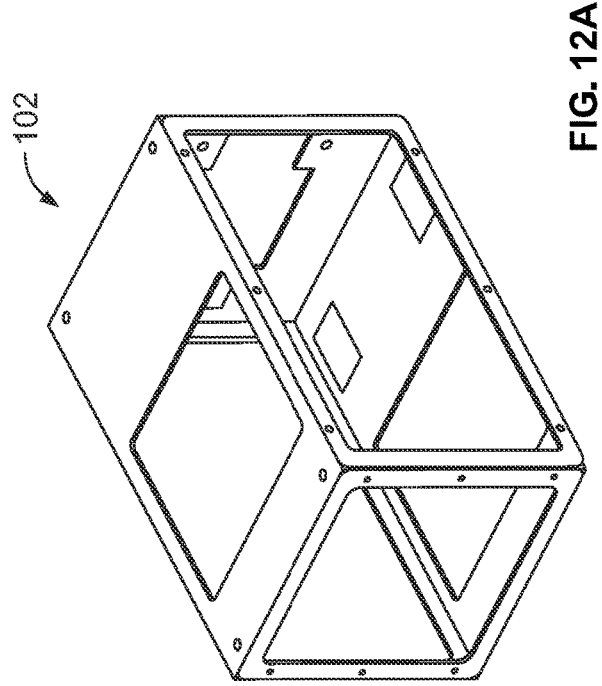
Figure 12C:
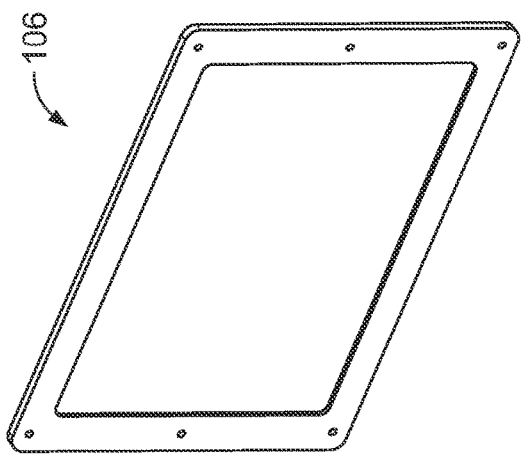

With reference to FIGS. 12A-12C, the components used to assemble an endfeed stub 100 are schematically depicted. In particular, FIG. 12A depicts an exemplary box structure 102 that includes mounted apertures along edges and faces thereof. FIG. 12B depicts a hanger 104 that may be mounted to an edge face of the box structure 102 to facilitate mounting of endfeed stub 100 relative to a desired structure. FIG. 12C depicts a gland plate 106 that may be mounted with respect to an open face of the box 102 to encase the internal volume thereof.

Figure 13A:
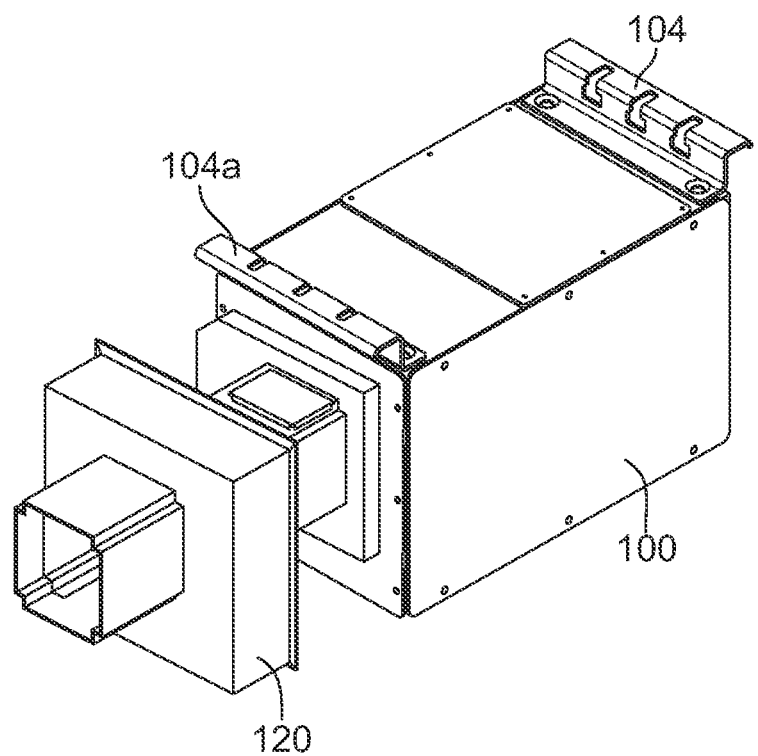
FIG. 13A and FIG. 13B depict an endfeed boot mounted with respect to an endfeed.
Figure 13B:
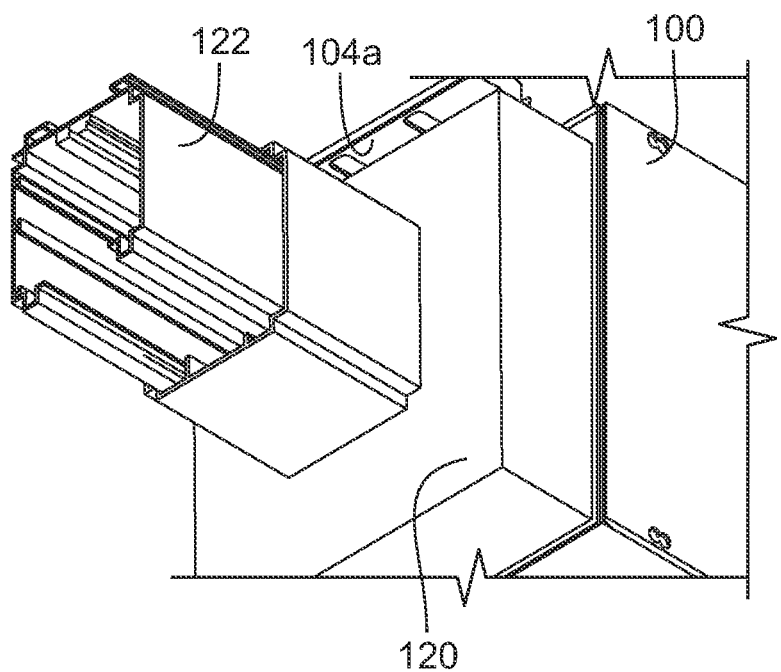

Turning to FIGS. 13A and 13B, an integrally formed endfeed boot 120 is schematically depicted in combination with endfeed stub 100. Of note, endfeed stub 100 includes a pair of hangers 104, 104a mounted with respect to a top surface for mounting purposes. Endfeed boot 120 may be injection molded as an integral unit and is configured/dimensioned to extend over a non-sleeved portion of busbar 122. A sleeve (not shown in FIGS. 13A, 13B) can be extended over the region of busbar 122 that remains unshielded when mounted relative to endfeed boot 120 and endfeed stub 100, as shown in FIG. 13B. Endfeed boot 120 advantageously seals off the entire front of endfeed 100, including punch outs for ISO ground bolts. A gasket member, e.g., an adhesive-backed gasket (not pictured), may be positioned between endfeed boot 120 and endfeed stub 100 to provide enhanced sealing therebetween.

Figure 14A:
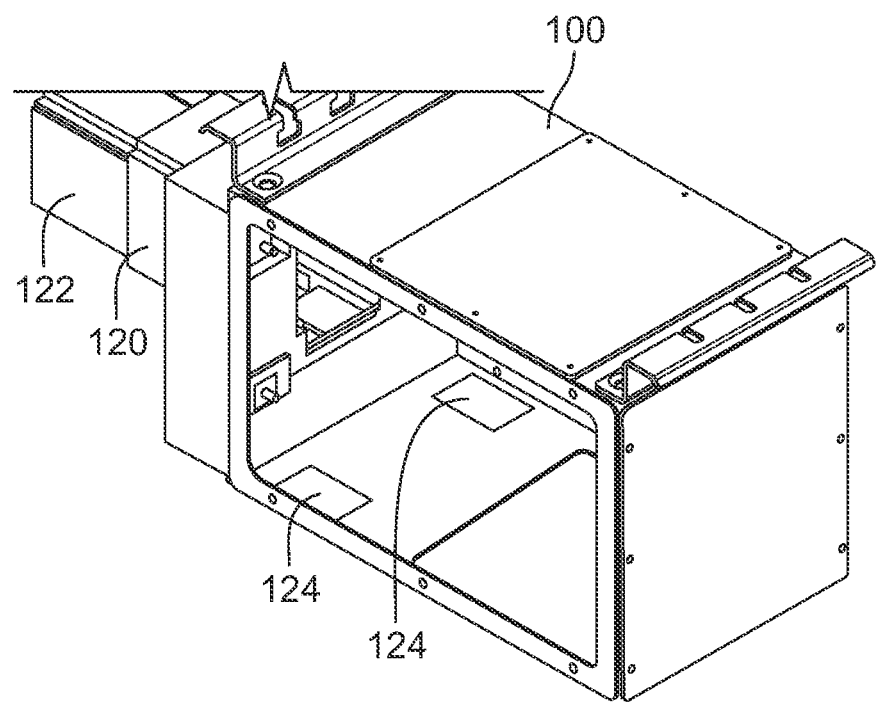
FIG. 14A and FIG. 14B depict internal sealing of an endfeed.
Figure 14B:
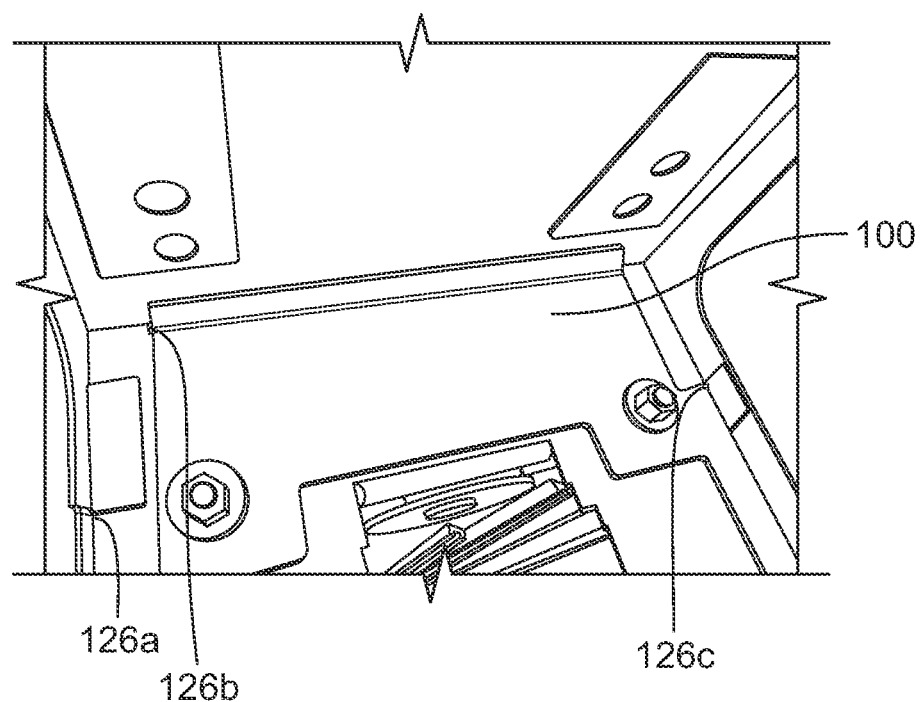

With reference to FIGS. 14A and 14B, further details relative to the sealing/water protection of endfeed stub 100 is schematically depicted. In particular and as shown in FIG. 14A, adhesive backed gasket material 124 may be applied to inner surfaces of endfeed 100 to seal off openings therein, e.g., punch outs for unused ground (GND) terminals and the like. With reference to FIG. 14B, exemplary regions where openings in the structure may exist are noted, i.e., openings 126a, 126b, 126c. These openings are merely illustrative of potential openings that may present themselves. Such openings may be sealed by further adhesive backed material, application of an epoxy, other sealing techniques, or combinations thereof, as will be apparent to persons skilled in the art.

Figure 15A:
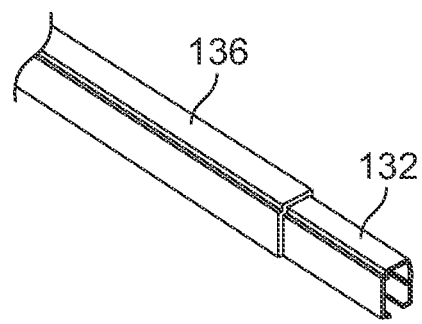
FIG. 15A, FIG. 15B, and FIG. 15C depict an endcap mounted with respect to a busway with a joint seal unit positioned over the unsleeved portion of the busway.
Figure 15B:
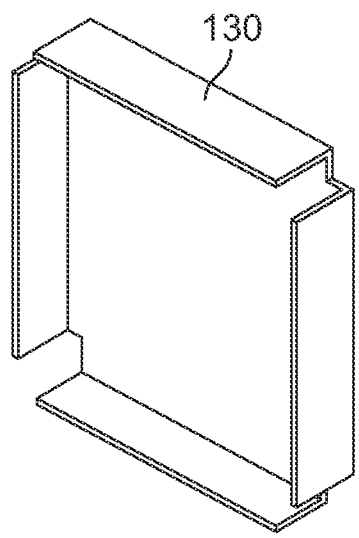
Figure 15C:
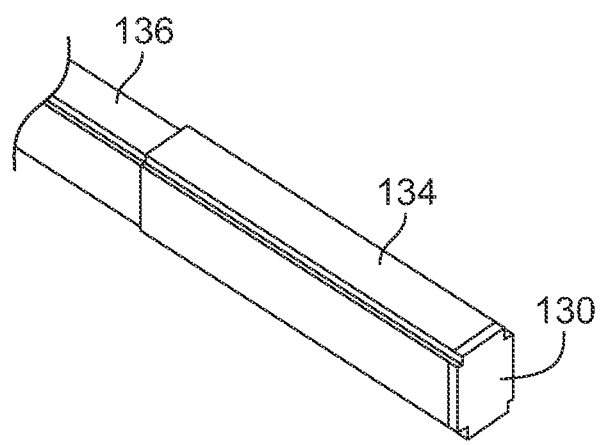

Turning to FIGS. 15A-15C, an endcap 130 may be mounted with respect to a sleeved busbar 132 and a joint sleeve 134 may be slid over the unsleeved portion of busbar 132 so as to protect the region between endcap 130 and sleeve 136. The joint sleeve 134 can cover at least a portion of flanges extending from the endcap 130 to secure the endcap 130 to the endpoint of the busbar 132, such that the flanges are positioned between the busbar 130 and the joint sleeve 134. The endcap 130 may be injection molded and a sealing member, e.g., an adhesive backed gasket, may be positioned between the endcap 130 and the busbar 132 to enhance sealing therebetween.

Figure 16A:
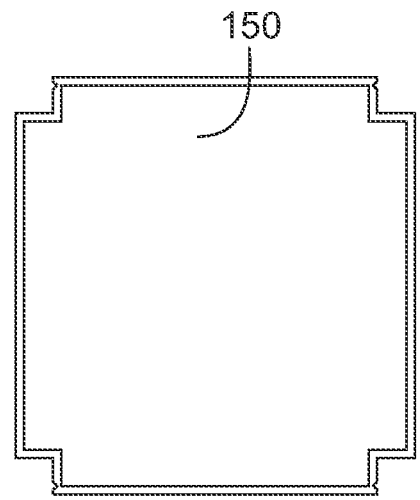
FIG. 16A, FIG. 16B and FIG. 16C depict notch regions associated with a sleeve.
Figure 16B:
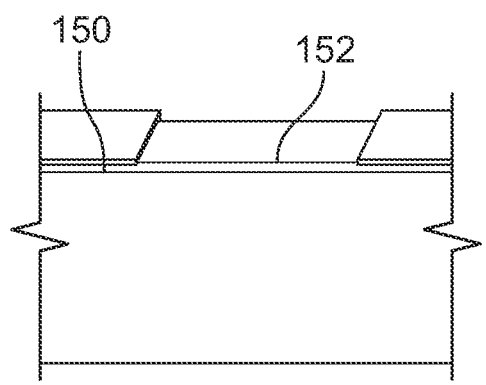
Figure 16C:
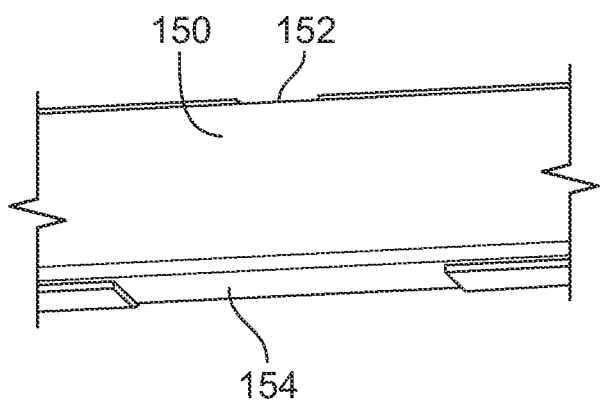

FIGS. 16A-16C schematically depict features of an exemplary sleeve 150 according to the present disclosure. The cross-section of the sleeve 150 as depicted in FIG. 16A illustrates that the hollow interior formed by the walls of the sleeve 150 is configured and dimensioned complementary to the outer surface of the busbar to allow for sliding of the sleeve 150 onto the busbar. In particular, sleeve 150 may feature one or more notch regions 152, 154 on the top and/or bottom of the sleeve 150 to facilitate cut out of the sleeve material for interaction directly with the underlying busway, e.g., to mount busway hanger(s) and/or tap off(s). The notch regions 152,154 can be substantially aligned on opposing sides of the sleeve 150, and define a height (as measured between outer surfaces) smaller than a height of the non-notch sections of the sleeve 150. For purposes of this description, the "top" of sleeve 150 is that surface of the sleeve that is positioned or oriented "upward" when utilized in the field, and the "bottom" of sleeve 150 is that surface of the sleeve that is positioned or oriented "downward" when utilized in the field. The length of the notch regions 152, 154 is generally selected to accommodate the accessory elements that are typically mounted with respect to a busway, i.e., hangers, tap offs and the like. As shown in FIG. 16C, notch region 154 on the "bottom" of sleeve 150 can be of greater length than notch region 152 on the "top" of sleeve 150. These relative dimensions are designed to accommodate the greater area generally required to mount tap offs as compared to hangers. However, the present disclosure is not limited by or to such relative dimensioning of top/bottom notch regions, and the top/bottom notch regions may be of the same length in exemplary embodiments of the present disclosure. The noted notch regions 152, 154 may be formed in the extrusion formation process of sleeve 150 or through other manufacturing techniques, as will be apparent to persons skilled in the art.

Figure 17A:
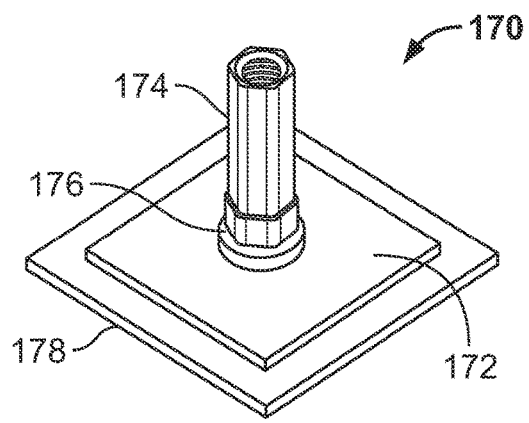
FIG. 17A, FIG. 17B and FIG. 17C depict mounting of a hanger relative to a sleeved busway.
Figure 17B:
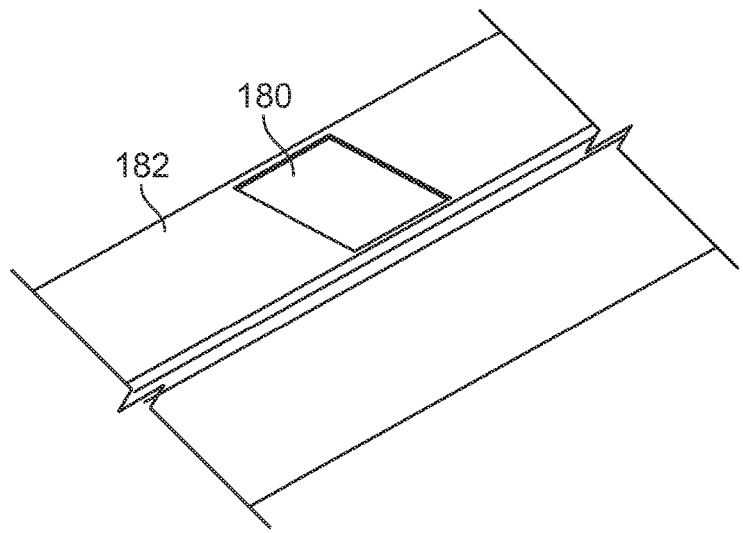
Figure 17C:
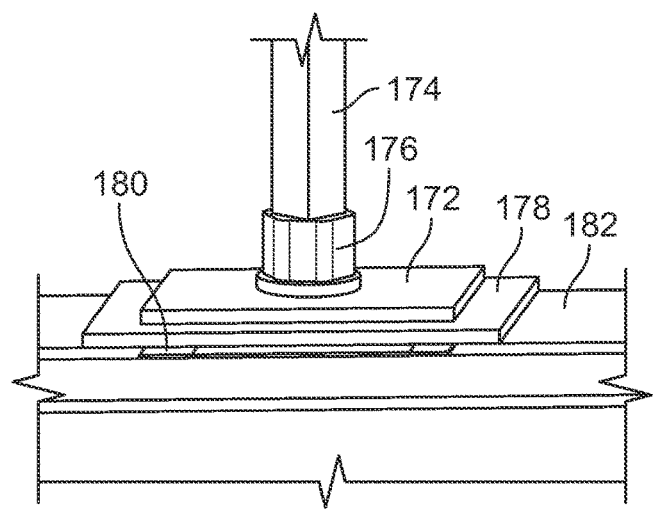

FIGS. 17A-17C schematically depict a hanger 170 mounted with respect to a busway 180 that is covered by a sleeve 182. Hanger 170 includes a substantially planar base 172 and an upwardly extending, threaded conduit 174 mounted with respect thereto. A coupling member 176 facilitates mounting of conduit 174 relative to base 172. An adhesive backed gasket 178 is positioned below the base 172 of hanger 170 for sealing of hanger 170 relative to busway 180 and sleeve 182. As shown in FIG. 17B, a notch region of sleeve 182 has been removed, thereby exposing busway 180 therebelow. As shown in FIG. 17C, hanger 170 and gasket 178 are positioned over the exposed portion of busway 180, i.e., the region exposed when the notch region of sleeve 182 is removed. Conduit 174 engages a threaded opening in busway 180 and, when tightened relative to busway 180, compresses gasket 178 relative to busway 180 and sleeve 182, thereby forming an effective seal therebetween.

Figure 18:
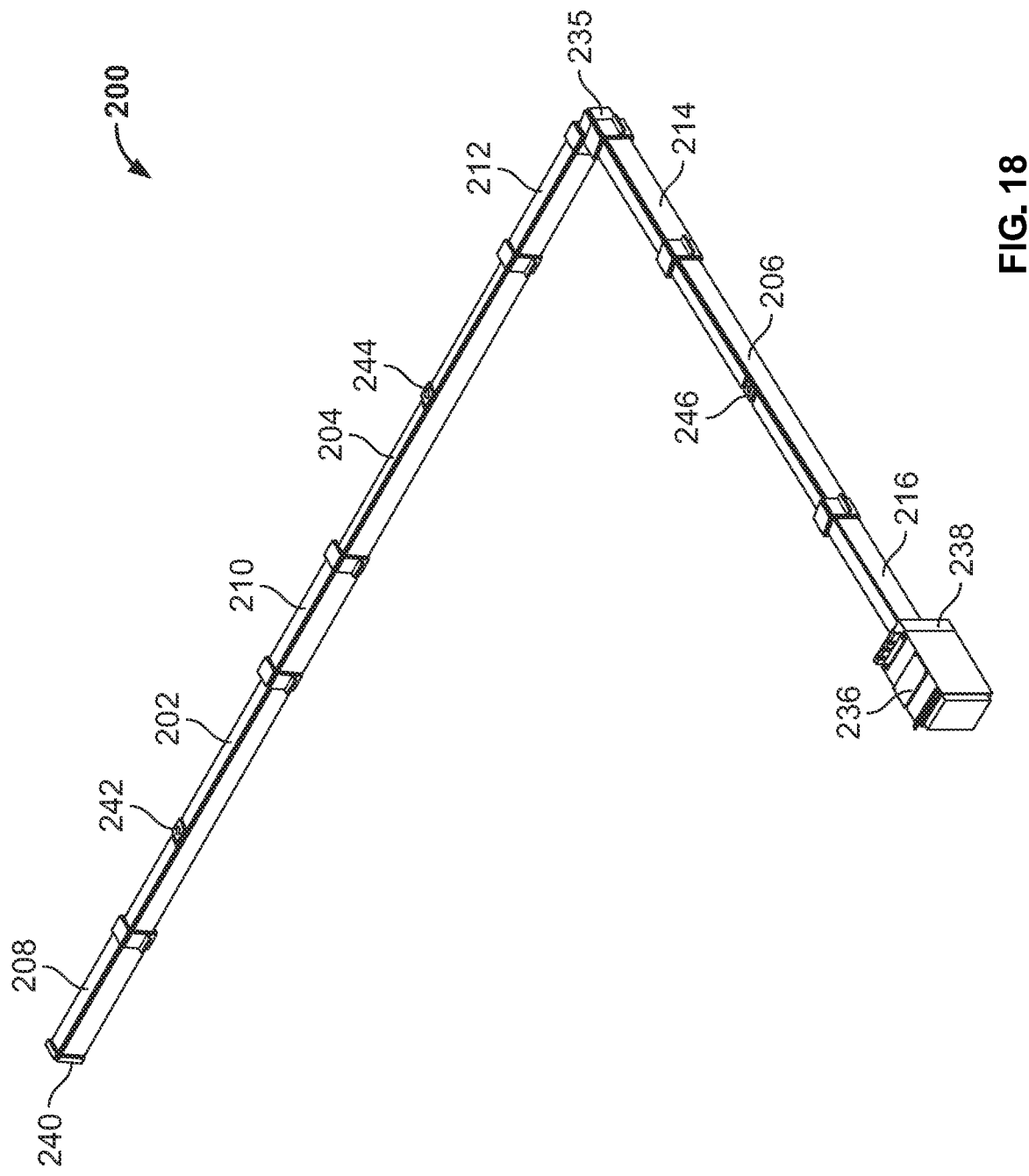
FIG. 18 depicts an exemplary busway system.

With reference to FIG. 18, an exemplary busway system 200 according to the present disclosure is schematically depicted. The busway system 200 includes (i) a series of sleeves 202, 204, 206, (ii) a series of joint couplers 208, 210, 212, 214, 216, (iii) a series of bracket assemblies 218, 220, 222, 224, 226, 228, 230, 232, 234, (iv) a sleeved elbow 235, (v) an endfeed 236 with endfeed boot 238, and (vi) an endcap 240. The sleeves include upwardly directed notch regions 242, 244, 246. Downwardly directed notch regions are not visible. Similarly, the underlying busways are not visible. Busway system 200 is merely illustrative of an arrangement that may be effectuated according to the present disclosure. The assembled busway system 200 is well suited to use in challenging environments to withstand such ambient challenges as liquids, dust and other potential contaminants.

Figure 19:
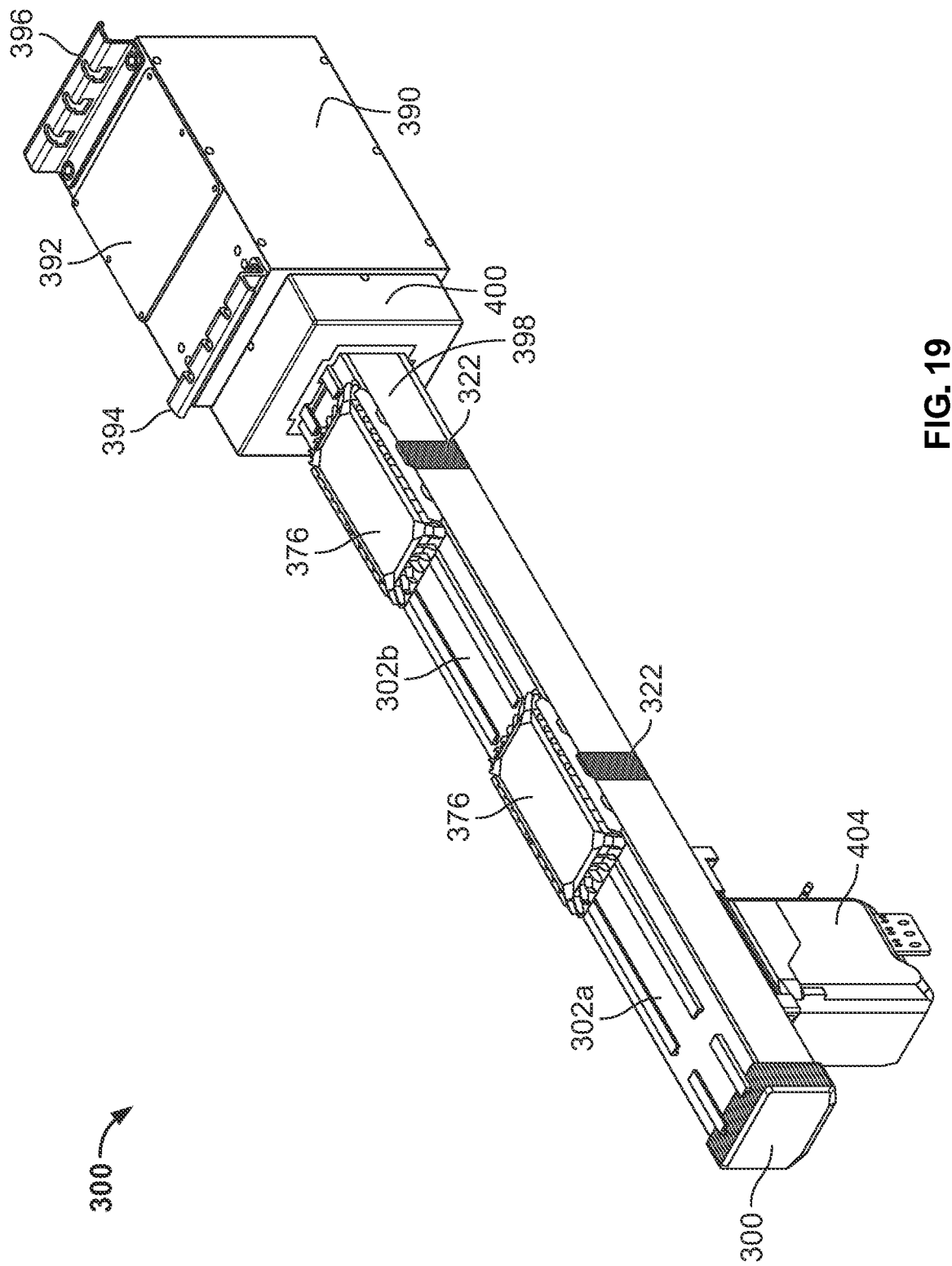
FIG. 19 depicts an exemplary busway system.
Figure 20:
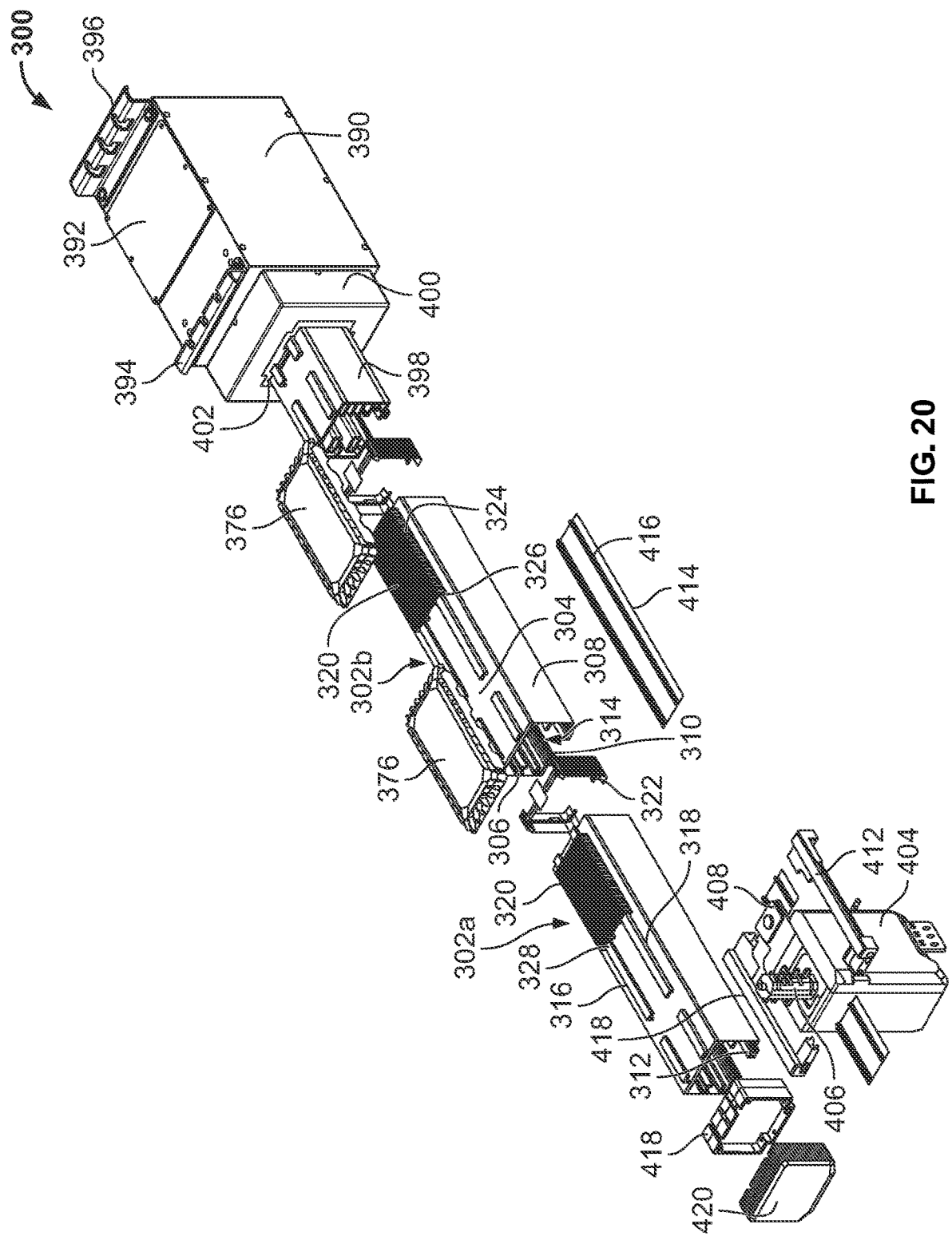
FIG. 20 depicts an exploded view of the exemplary busway system of FIG. 19.
Figure 21:
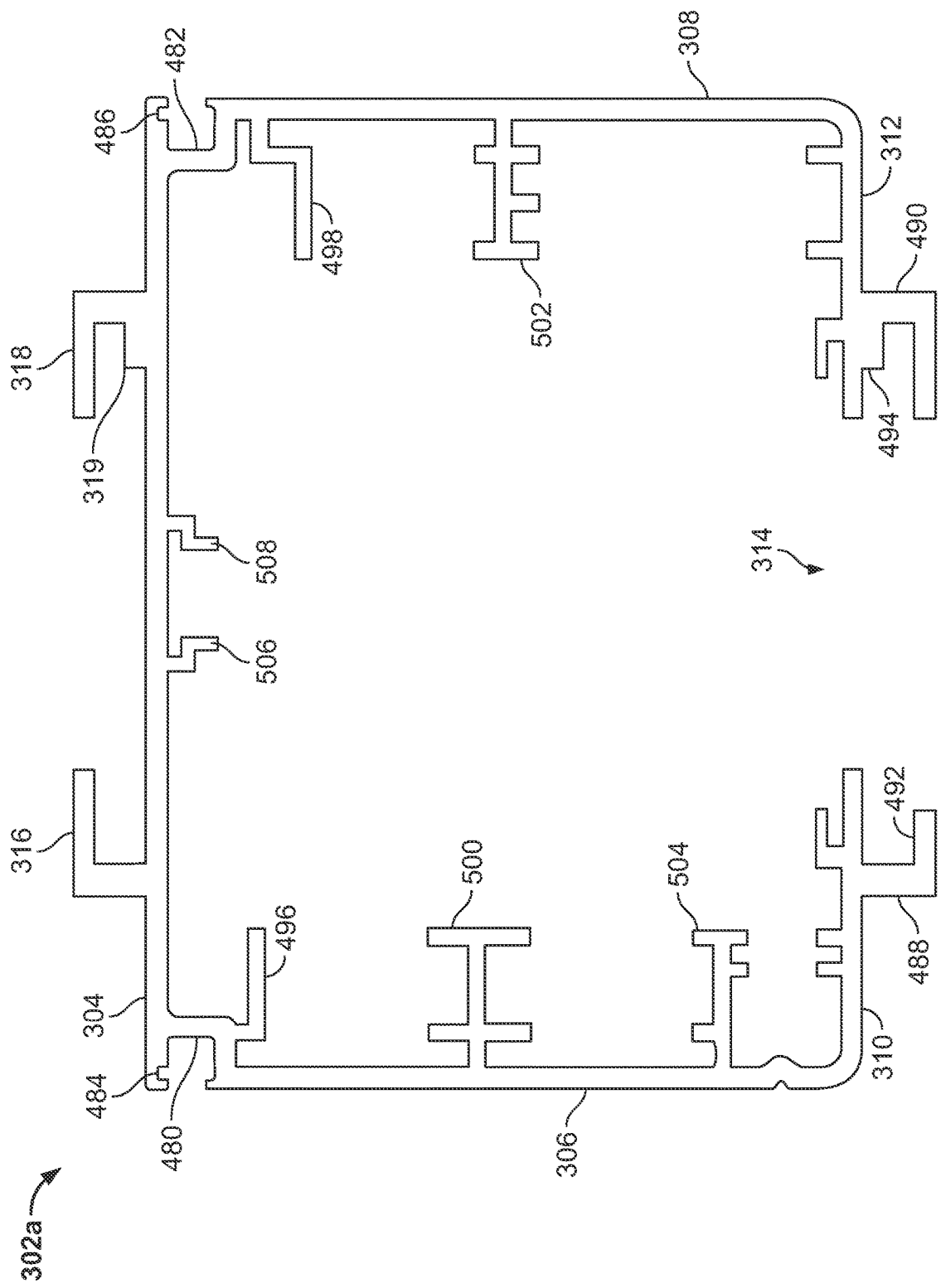
FIG. 21 depicts a side view of an exemplary busway of FIG. 19.
Figure 22A:
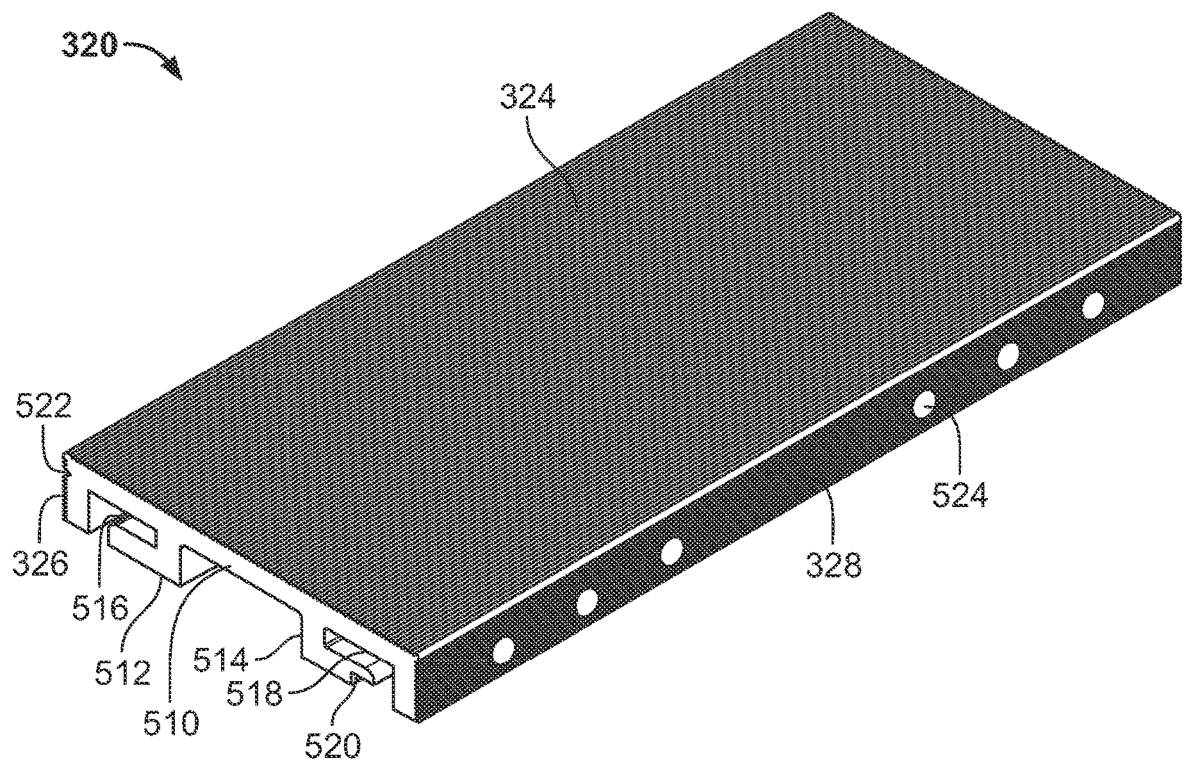
FIG. 22A and FIG. 22B depict perspective and side views of a coupler of the exemplary busway system of FIG. 19.
Figure 22B:
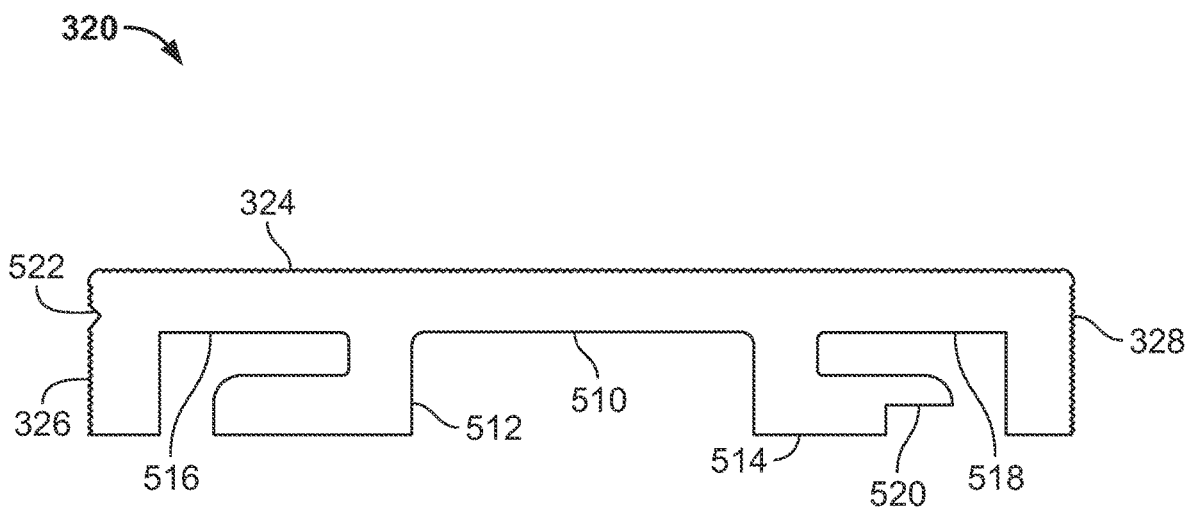

With reference to FIGS. 19 and 20, perspective and exploded views of an exemplary busway system 300 according to the present disclosure are schematically depicted. The busway system 300 includes one or more busbars or busways 302a, 302b configured to detachably coupled to each other using components of the busway system 300. FIG. 21 is a side view of the busway 302a, although it should be understood that the busway 302b defines a substantially similar structure. With reference to FIGS. 19, 20 and 21, each of the busways 302a, 302b includes a top wall 304, side walls 306, 308 extending substantially perpendicularly from the top wall 304, and bottom flanges 310, 312 extending inwardly towards each other. The flanges 310, 312 can extend substantially perpendicularly relative to the respective side walls 306, 308. The flanges 310, 312 are spaced from each other to define a channel 314 therebetween. In combination, the top wall 304, side walls 306, 308, and bottom flanges 310, 312 define a hollow interior or enclosure formed by the busways 302a, 302b that extends the length of the busway 302a, 302b between opposing ends (e.g., first and second ends).

The busways 302a, 302b each include a pair of extensions 316, 318 protruding from the top wall 304. The extensions 316, 318 extend substantially perpendicularly from the top wall 304 and can define a substantially T-shaped configuration or a substantially L-shaped configuration (e.g., with the lateral extensions protruding in opposing directions). For example, as shown in FIG. 21, the extensions 316, 318 can define L-shaped protrusions that include a vertical member that initially extends perpendicularly from the top wall 304, and a horizontal member that extends perpendicularly from the vertical member. In some embodiments, one of the extensions (e.g., extension 318) can include a step 319 connected to the vertical member and the top wall 304. The step 319 can act as a keying element to assist with alignment of components during assembly. The extensions 316, 318 are spaced laterally from each other and extend along the length of the busway 302a, 302b. The busways 302a, 302b include multiple pairs of extensions 316, 318, with each pair separated from the next pair by a predetermined space or gap. The gap allows for addition or removal of components of the busway system 300 as will be discussed in greater detail below. Although illustrated as being straight or linear extensions of material, in some embodiments, one or more busways can form a non-linear configuration (e.g., an angled or curved corner joint, or the like).

With reference to FIG. 21, the busways 302a, 302b include a groove or channel 480, 482 formed in the respective side wall 306, 308 immediately adjacent to the top wall 304. The channel 480, 482 extends the length of the busway 302a, 302b. The inner surface of the top wall 304 within the channel 480, 482 includes a groove 484, 486 extending the length of the channel 480, 482. As will be discussed in greater detail below, the channels 480, 482 are configured to receive a complementary engagement feature of the coupler seal 376 such that the engagement feature snaps into the groove 484, 486. The bottom flanges 310, 312 each include substantially L-shaped extensions 488, 490 that include a vertical member perpendicularly extending from the bottom flanges 310, 312, and horizontal members 492 that extend perpendicularly from the vertical members and towards each other. The extensions 488, 490 form a channel therebetween that can be configured and dimensioned to receive a rotatable feature of a tap off box 404 to ensure proper alignment of the tap off box 404 with the busway 302a, 302b. In some embodiments, one of the extensions 488, 490 can include a step 494 formed at the bottom flange 310, 312 and the vertical member of the extension 488, 490, the step 494 acting as a keying element to ensure proper orientation of the tap off box 404. The interior of the busway 302a, 302b can include multiple flanges 496-508 extending from the inner walls, with one or more of the flanges 496-508 acting as conductors for electrical and mechanical engagement with the conductors of a power distribution paddle of the tap off box 404.

With reference to FIGS. 19, 20, 22A and 22B, the busway system 300 includes one or more couplers 320 (e.g., metal couplers) and one or more joint seals 322 (e.g., plastic joint seals) for coupling two busways 302a, 302b to each other. Each coupler 320 includes a substantially planar top surface 324 and side flanges 326, 328 (e.g., side walls) that extend downwardly substantially perpendicularly relative to the top surface 324. A bottom surface 510 includes substantially L-shaped flanges 512, 514 extending substantially perpendicularly from the bottom surface 510 and towards the respective side flanges 326, 328. In particular, each flange 512, 514 includes a vertical member extending perpendicularly from the bottom surface 510, and a horizontal member extending perpendicularly from the vertical member towards the respective side flange 326, 328. The configuration of the flanges 512, 514 and flanges 512, 514 forms a substantially L-shaped inner groove 516, 518 between the flanges 326, 328 and flanges 512, 514. The grooves 516, 518 are configured and dimensioned complementary to the L-shaped extensions 316, 318 at the top wall 304 of the busway 302a, 302b. One of the flanges (e.g., flange 514) can include a cutout 520 extending the length of the coupler 320, the cutout 520 configured complementary to the step 319 of the busway 302a, 302b. In some embodiments, one of the flanges 512, 514 can include a groove 522 formed in the outer surface near the intersection of the flange 512, 514 and the top surface 324. In some embodiments, the flanges 512, 514 can include one or more openings 524 formed therein. In some embodiments, the openings 524 can be threaded and configured to receive one or more set screws for securing the coupler 320 to the extensions 316, 318 of the busway 302a, 302b.

During assembly, the space defined between the flanges 326, 328, 512, 514 is configured to receive and surround the extensions 316, 318, with the outwardly directed flanges 512, 514 being positioned under the lateral extension of the T-shaped or L-shaped extensions 316, 318, thereby engaging with and preventing removal of the coupler 320 from the extensions 316, 318. The flanges 326, 328, 512, 514 can therefore hook around the extensions 316, 318 to prevent upward removal of the coupler 320 relative to the busway 302a, 302b. The coupler 320 can therefore be slid onto one end of the busway 302a, 302b and engaged with the extensions 316, 318, allowing the coupler 320 to be slid along the top wall 304 of the busway 302a, 302b with the extensions 316, 318 guiding sliding movement of the coupler 320 along the top wall 304.

Figure 23:
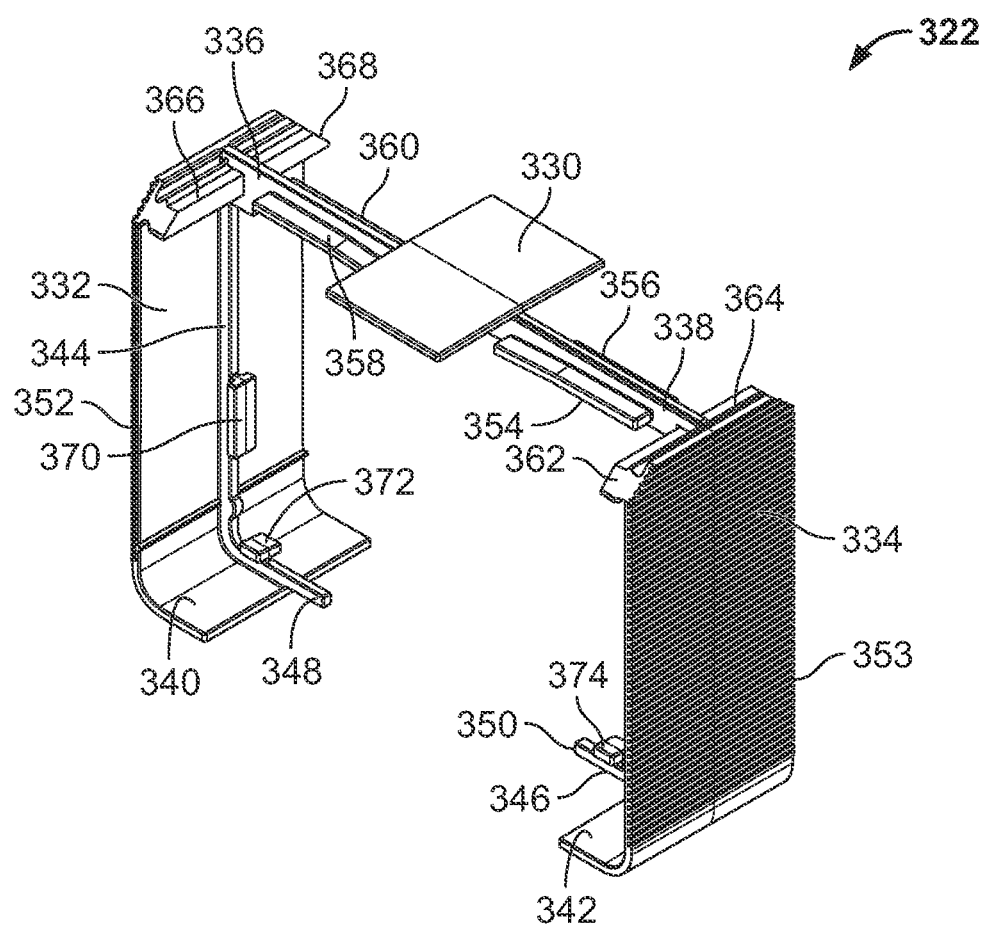
FIG. 23 depicts a joint seal of the exemplary busway system of FIG. 19.

With reference to FIGS. 19, 20 and 23, the joint seal 322 includes a top, central panel 330 connected to side panels 332, 334 by lateral connecting members 336, 338. In some embodiments, the central panel 330 can define the same width as the width of the side panels 332, 334 (as measured between front and rear edges 352, 353), with the connecting members 336, 338 defining a substantially smaller width. Each side panel 332, 334 includes an inwardly directed bottom flange 340,342 extending towards each other. The bottom flanges 340, 342 are spaced from each other to define a channel therebetween. In some embodiments, the channel between the flanges 340, 342 can be substantially equal in distance as the channel 314 between flanges 310, 312 of the busway 302a, 302b. When assembled, the channel between the flanges 340, 342 allows for a continues channel 314 to be formed between connected busways 302a, 302b.

Each joint seal 322 includes a central rib 344, 346 that extends centrally along the inner surface of at least the side panels 322, 334 and bottom flanges 340, 342. In some embodiments, the central rib 344, 346 extends beyond the edge of the bottom flanges 340, 342, forming two endpoints 348, 350 extending towards each other. The edges of the bottom flanges 340, 342 are spaced a substantially equal distance as the width of the channel 314 of the busways 302a, 302b such that when coupled together, a continuous, uniform channel is formed between the busways 302a, 302b and the joint seal 322. The central rib 344, 346 can act as a stop for limiting how far the respective busways 302a, 302b can join with the joint seal 322. In some embodiments, the joint seal 322 can include engagement features 354, 356, 358, 360 (e.g., diversion flanges, or the like) extending from opposing sides of connecting members 336, 338 between the central panel 330 and the side panels 332, 334. The features 354, 356, 358, 360 can be configured to sit against the inner walls of the busways 302a, 302b to divert or redirect any potential ingress of water and/or dust away from conducts that are disposed inside of the busway 302a, 302b, thereby acting as one of the protective features of the assembly. engage and/or interlock with the top wall 304 of the busways 302a, 302b to maintain the components assembled. The joint seal 322 includes engagement features 362, 364, 366, 368 (e.g., flanges, or the like) extending inwardly from an upper, inner surface of the side panels 332, 334 and configured to engage top corners of the busways 302a, 302b during assembly. The joint seal 322 includes engagement features 370 (e.g., T-shaped flange, not visible on side panel 334) extending from the central rib 344, 346 between the top and bottom edges of the side panels 332, 334, and engagement features 372, 374 extending from the central rib 344, 346 at or near the bottom flanges 340, 342. The flanges 370, 372, 374 are configured to engage with side walls 306, 308 and bottom flanges 310, 312, respectively, of the busways 302a, 302b during assembly to prevent the housing of the busway 302a, 302b from flaring out, ensuring a tight seal between the joint seal 322 and the busways 302a, 302b.

For assembly, the coupler 320 can be slid over and engaged with extensions 316, 318 of the busway 302a, and the end of the busway 302a can be inserted into the enclosure formed on one side of the joint seal 322 until the edges of the busway 302a abut the central rib 344, 346. During insertion of the busway 302a within the confines of the central panel 330, side panels 332, 334, and bottom flanges 340, 342, the engagement features of the joint seal 322 can engage with corresponding structures on the walls of the busway 302a to maintain connection of the busway 302a with the joint seal 322 via, e.g., a friction fit, a snap fit, combinations thereof, or the like. The busway 302b can be inserted into the opposing side of the joint seal 322 in a substantially similar manner as the busway 302a. Once both busways 302a, 302b have been engaged with the joint seal 322, the coupler 320 can be slid over the joint between the busways 302a, 302b and the joint seal 322. In some embodiments, the coupler 320 can be centered over the joint between the busways 302a, 302b and the joint seal 322. By accommodating the profile of the busways 302a, 302b, the joint seal 322 prevents infiltration of dust and/or liquid into the formed joint. The coupler 320 assists in covering the joint to further prevent infiltration of dust and/or liquid into the formed joint between the busways 302a, 302b. [

Figure 24A:
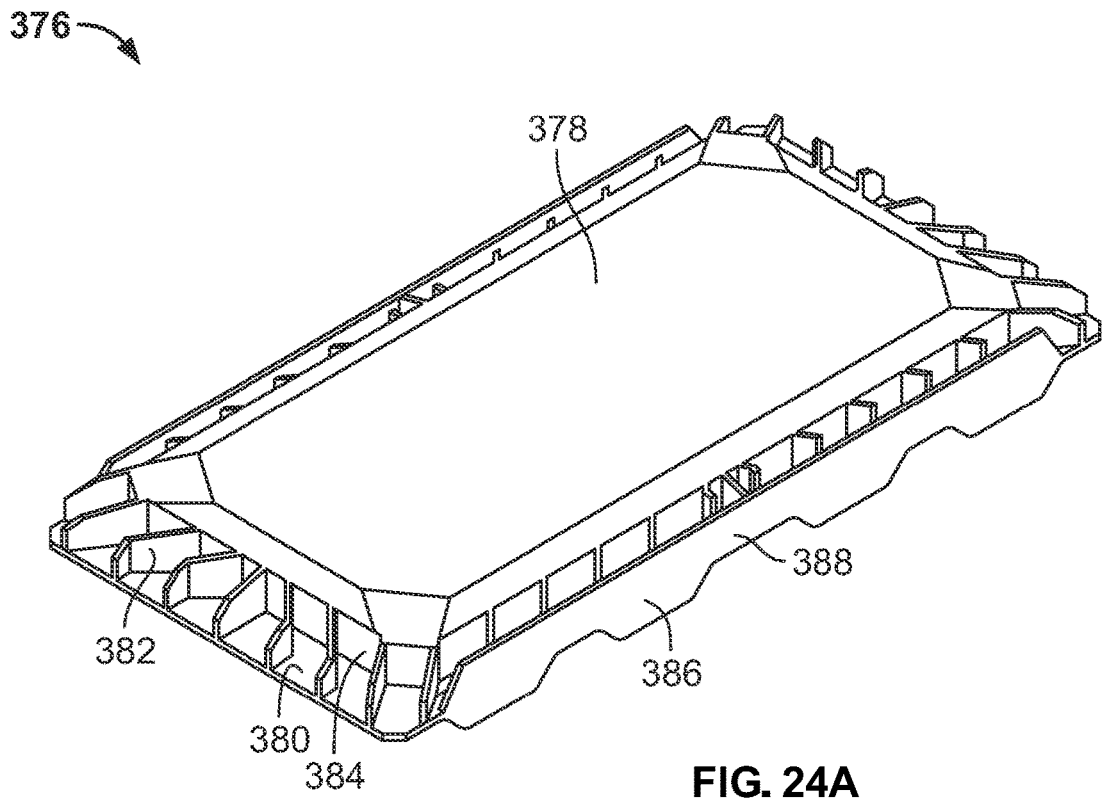
FIG. 24A and FIG. 24B depict top and bottom perspective views of a coupler seal of the exemplary busway system of FIG. 19.
Figure 24B:
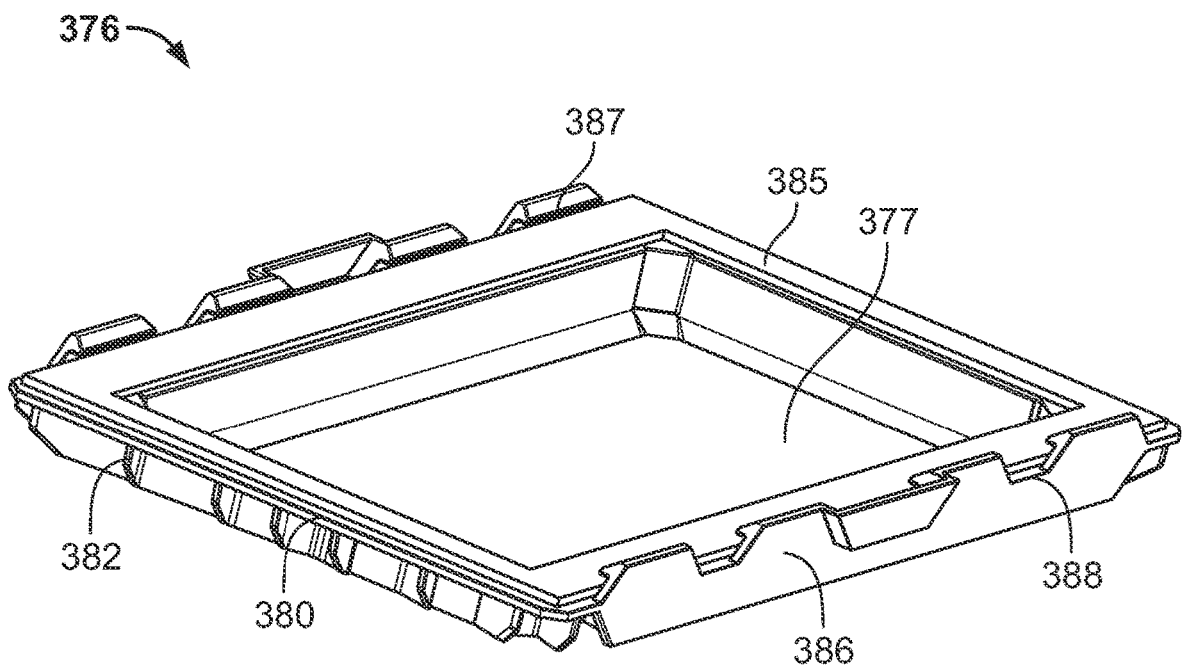

With reference to FIGS. 19, 20, 24A and 24B, the busway system 300 includes a coupler seal 376 configured to be secured over the coupler 320 to prevent passage of dust and/or liquid into the joint between the busways 302a, 302b and the joint seal 322. The coupler seal 376 includes a solid central body section 378 that can define a substantially rectangular configuration complementary to the coupler 320. For example, as shown in FIG. 24B, the bottom surface of the coupler seal 376 can define a cavity 377 (e.g., a hollow interior) configured and dimensioned to at least partially receive therein the top surface and perimeter edges of the coupler 320. Each perimeter edge of the coupler seal 376 can include a perimeter flange 380 extending outward along a plane aligned with a bottom surface of the body section 378. The coupler seal 376 includes support ribs 382 extending from side walls 384 of the body section 378 to the outer edge of the perimeter flanges 380. In some embodiments, two opposing side edges of the coupler seal 376 can include a substantially planar wall 386 with spaced, repeating cutouts 388 formed in the bottom edge of the wall 386. The inner surfaces of the walls 386 can include inwardly directly flanges 387 with hook-like features that can be flexed or biased outwardly when the coupler seal 376 is being positioned over the coupler 320. The flanges 387 can hook or snap around (or into) a complementary groove or channel 480, 482 (and/or groove 484, 486) formed along the length of the busway 302a, 302b, ensuring the coupler seal 376 remains positioned over the coupler 320 and is maintained in position relative to the busway 302a, 302b. After positioning of the coupler 320 in the desired position along the busways 302a, 302b, the coupler seal 376 can be snap fit over the coupler 320 to cover the joint between the busways 302a, 302b. In some embodiments, a gasket 385 can be positioned along the flat bottom perimeter surface surrounding the cavity 377 to form a seal between the coupler seal 376 and the busway 302a, 302b.

With reference to FIGS. 19 and 20, the busway system 100 includes one or more endfeeds 390 coupled to the busway 302b to supply power to the busways 302a, 302b. The endfeed 390 can be substantially similar to the endfeed stub 100 discussed above with respect to FIGS. 11A, 11B, 12A, 12B, 12C, 13A and 13B, except for the distinctions noted herein. The endfeed 390 can define a substantially cube-like or rectangular housing. In some embodiments, one or more walls of the endfeed 390 can include openings that can be selectively covered with gland plates 392. One or more hangers 394, 396 (e.g., mounting flanges) can be fastened to the top surface of the endfeed 390 to facilitate mounting of the endfeed 390 to a desired structure (e.g., ceiling or other supporting structure for the busway system 100).

The endfeed 390 includes a busway 398 extending from one side of the housing. The busway 398 is substantially similar in structure and function to the busways 302a, 302b and is configured to be coupled to the adjacent busway 302b in the same manner as discussed above with respect to coupling of the busways 302a, 302b (e.g., including the joint seal 322, the coupler 320, and the coupler seal 376. Prior to coupling of the busway 398 to the busway 302b, an endfeed boot 400 can be positioned over the busway 398 and secured to the endfeed 390. The endfeed boot 400 can define a substantially similar cross-section (e.g., rectangular, square, or the like) to the endfeed 390 and is configured to cover one end of the endfeed 390 in a dust and liquid resistant manner. The endfeed boot 400 includes a central opening 402 complementary to the busway 398 to allow for passage of the busway 398 therethrough.

With reference to FIGS. 19 and 20, after the desired number of busways 302a, 302b have been coupled relative to each other and with the endfeed 390, one or more tap off boxes 404 can be at least partially inserted into and coupled with the channel 314 of the busways 302a, 302b. The tap off box 404 can have the same dust and liquid rating as the other components of the busway system 300 (e.g., at a minimum a NEMA 3X rating). The tap off box 404 includes a power distribution paddle head 406 rotatable relative to the housing which can be inserted into and rotated within the channel 314 of the busway 302a, 302b to maintain the position of the tap off box 404 and to electrically connect the tap off box 404 to the busway 302a, 302b. Power provided by the endfeed 390 can therefore be supplied along the busway 302a, 302b to the tap off box 404. In some embodiments, a bolted plate assembly 408 with sealing assemblies 410, 412 can be positioned between the tap off box 404 and the busway 302a, 302b to ensure the tap off box 404 remains properly sealed from dust and liquid. The sealing assemblies 410, 412 can define substantially U-shaped gaskets configured to snap together around the top of the tap off box 404.

After the desired number of tap off boxes 404 has been coupled with the busway 302a, 302b, cover plates 414 can be snap fit at least partially into the channel 314 to cover and seal the channel 314 of the busways 302a, 302b. The cover plates 414 can include outwardly extending flanges 416 configured to fit within and snap around the flanges 310, 312 of the busway 302a, 302b to maintain the position of the cover plates 414 relative to the busway 302a, 302b. The cover plates 414 can be cut or trimmed as needed to fit around the tap off boxes 404 connected to the busway system 300.

Figure 25:
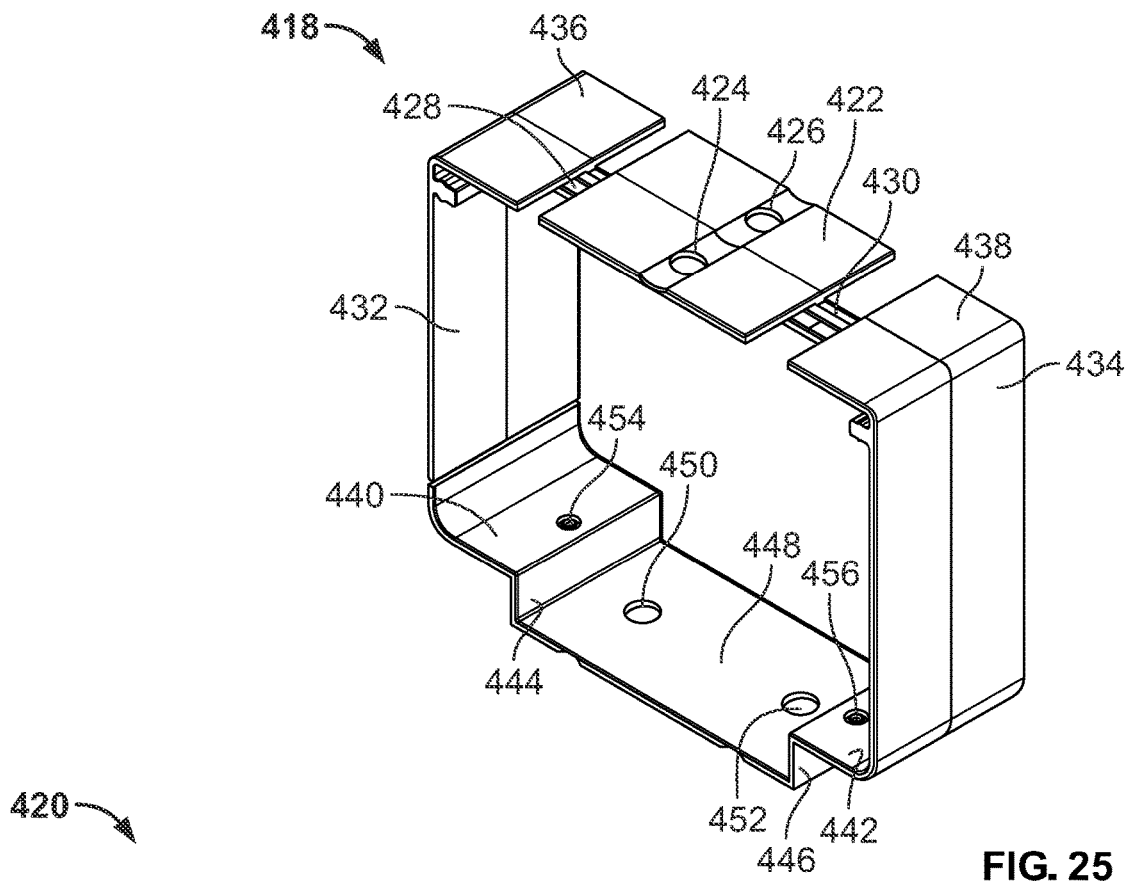
FIG. 25 depicts an endcap seal of the exemplary busway system of FIG. 19.

With reference to FIGS. 19, 20 and 25, the busway system 300 includes an endcap seal 418 configured to couple on one end with the busway 302a and with an endcap 420 on an opposing end. The endcap seal 418 includes a top plate 422 with two openings 424, 426 formed therein. Connecting members 428, 430 connect opposing side plates 432, 434 to opposing sides of the top plate 422. Each side plate 432, 434 includes an upper inwardly directed flange 436, 438, and a lower inwardly directed flange 440, 442. The endcap seal 418 includes downwardly directed flanges 444, 446 extending from the flanges 440, 442, and a bottom connecting plate 448 connecting the flanges 444, 446. The endcap seal 418 generally defines a square or rectangular configuration. The plate 448 includes two spaced openings 450, 452 formed therein. Flanges 440, 442 can include threaded openings 454, 456 configured to receive set screws therein. The set screws can be used to secure the endcap seal 418 to the busway 302a, 302b housing. The inner surfaces or profile of the endcap seal 418 are configured and dimensioned complementary to the outer surfaces of the busway 302a, 302b such that the endcap seal 418 can be inserted over the end of the busway 302a, 302b channel 314 opening.

Figure 26:
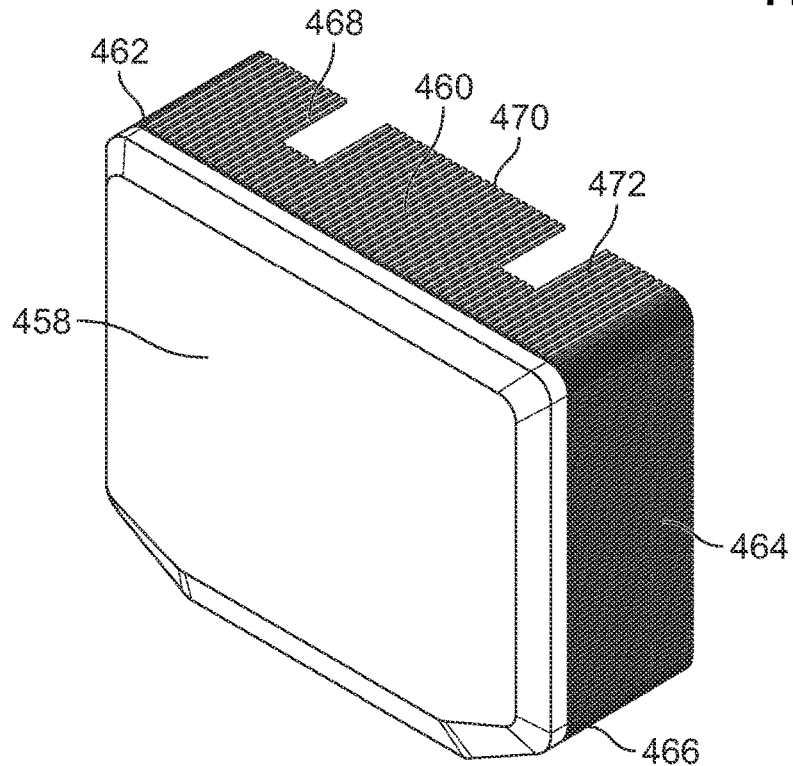
FIG. 26 depicts an endcap of the exemplary busway system of FIG. 19.

With reference to FIGS. 19, 20 and 26, the busway system 300 includes the endcap 420. The endcap 420 includes a front closed wall 458, a top wall 460, side walls 462, 464, and a bottom wall 466. The walls 458, 460, 462, 464, 466 define an inner enclosure configured and dimensioned to receive or fit over at least a portion of the endcap seal 418 extending from the busway 302a, and at least a portion of the outer surface of the busway 302a. The endcap 420 can include two cutouts 468, 470 formed in the top wall 460 and extending from a rear edge 472 towards the front closed wall 458 at least a portion of the width of the endcap 420. The position of the cutouts 468, 470 substantially aligns with the extensions 316, 318 of the busway 302a such that the ends of the extensions 316, 318 can be inserted into the cutouts 468, 470 during assembly. With the endcap seal 418 partially inserted into the interior of the busway 302a, the endcap 420 can be positioned over the endcap seal 418 and at least partially over the busway 302a. The combination of the endcap seal 418 and the endcap 420 creates a seal capable of preventing infiltration of dust, solids and liquids into the interior of the busway 302a. The entire assembly of the busway system 300 is therefore capable of preventing infiltration of undesired elements into the interior of the busway system 300, resulting in a more secure and easily reconfigurable system that can be used in harsh environments.

Although the busway systems of the present disclosure have been described with reference to exemplary embodiments thereof, the present disclosure is not limited by or to such exemplary embodiments. Rather, the busway systems and associated components thereof are susceptible to variation, modification and refinement, and such variations, modifications and refinements are expressly within the scope hereof.

The invention claimed is:

1. A busway system, comprising:
   a first busway including a first end;
   a second busway including a second end;
   a joint seal coupling the first busway to the second busway in a facing relationship, the joint seal including (i) panels configured to at least partially slide over the first end of the first busway, and at least partially slide over the second end of the second busway to couple the first busway to the second busway in the facing relationship, and (ii) a rib extending from an inner surface of the panels, the rib acting as a stop limiting how far the panels are capable of sliding over the first and second busways, wherein the joint seal creates a seal at both a first joint formed by the first busway and the rib of the joint seal, and a second joint formed by the second busway and the rib of the joint seal, such that the rib is positioned between the first and second ends of the first and second busways;
   a coupler positioned over the joint seal to cover both the first joint and the second joint; and
   a coupler seal positioned over the coupler.

2. The busway system of claim 1, wherein the seal created by the joint seal prevents infiltration of dust and liquid through the first and second joints.

3. The busway system of claim 1, wherein the first and second joints formed by the first busway, the second busway, and the joint seal are rated NEMA 3X.

4. The busway system of claim 1, wherein the first busway and the second busway each include a top wall, side walls, and bottom flanges extending from the respective side walls in a spaced manner, the bottom flanges forming a channel therebetween extending into a hollow interior of the first busway and the second busway.

5. The busway system of claim 4, wherein the first busway and the second busway each include a pair of extensions protruding from the top wall and extending parallel to a length of the first busway and the second busway, respectively.

6. The busway system of claim 5, wherein each extension of the pair of extensions defines an L-shaped or a T-shaped configuration.

7. The busway system of claim 5, wherein the coupler includes a top surface and side flanges extending from the top surface to define a hollow space therebetween.

8. The busway system of claim 7, wherein the coupler is configured to be slidingly positioned over and engaged with the pair of extensions on the first and second busways over the first and second joints formed by the joint seal.

9. The busway system of claim 7, wherein the coupler seal is configured to snap fit over and at least partially receive the coupler.

10. The busway system of claim 1, wherein the panels of the joint seal include a top panel connected to side panels by lateral connecting members, and bottom flanges spaced from each other to align with a channel formed in a bottom surface of the first and second busways.

11. The busway system of claim 1, wherein the rib is configured to limit a depth by which the first and second busways slide into the joint seal.

12. The busway system of claim 1, comprising an endfeed including a third busway coupled to the first busway or the second busway, the endfeed providing power to the third busway, the first busway, and the second busway.

13. The busway system of claim 12, comprising an endfeed boot positioned around the third busway and encasing one side of the endfeed.

14. The busway system of claim 1, comprising one or more tap off boxes mechanically and electrically coupled within a channel of the first busway or the second busway.

15. The busway system of claim 1, comprising an endcap seal including top, side and bottom plates configured to be at least partially inserted within a hollow interior of the first busway or the second busway.

16. The busway system of claim 15, comprising an endcap configured to fit over a protruding end of the endcap seal, and at least partially fit over the first end or the second opposing end of the first busway, or the third end or the opposing fourth end of the second busway.

17. A method for assembling a busway system, comprising:
   at least partially sliding panels of a joint seal over a first end of a first busway;
   at least partially sliding the panels of the joint seal over a second end of a second busway to couple the first busway to the second busway in a facing relationship, wherein the joint seal includes a rib extending from an inner surface of the panel, the rib acting as a stop limiting how far the panels are capable of sliding over the first and second busways, and wherein the joint seal creates a seal at both a first joint formed by the first busway and the rib of the joint seal, and a second joint formed by the second busway and the rib of the joint seal, such that the rib is positioned between the first and second ends of the first and second busways;
   positioning a coupler over the joint seal to cover both the first joint and the second joint; and
   positioning a coupler seal over the coupler.

18. The method of claim 17, comprising sliding the coupler over a pair of extensions protruding from a top wall of the first and second busways until the coupler covers both the first joint and the second joint.

19. The method of claim 18, comprising snap fitting the coupler seal over the coupler.

20. The method of claim 17, comprising coupling a third busway of an endfeed to the first busway or the second busway, the endfeed providing power to the third busway, the first busway and the second busway.

* * * * *